(12) United States Patent
Fan et al.

(10) Patent No.: US 12,563,515 B2
(45) Date of Patent: Feb. 24, 2026

(54) TIME SYNCHRONIZATION METHOD, ACCESS NETWORK DEVICE, COMMUNICATION APPARATUS, COMPUTER STORAGE MEDIUM, AND COMMUNICATION SYSTEM

(71) Applicant: HUAWEI TECHNOLOGIES CO., LTD., Guangdong (CN)

(72) Inventors: Qiang Fan, Shanghai (CN); Chong Lou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 691 days.

(21) Appl. No.: 17/869,930

(22) Filed: Jul. 21, 2022

(65) Prior Publication Data

US 2022/0361129 A1 Nov. 10, 2022

Related U.S. Application Data

(63) Continuation of application No. PCT/CN2020/074006, filed on Jan. 23, 2020.

(51) Int. Cl.
H04W 56/00 (2009.01)
(52) U.S. Cl.
CPC .............................. H04W 56/0045 (2013.01)
(58) Field of Classification Search
None
See application file for complete search history.

(56) References Cited

U.S. PATENT DOCUMENTS 10,582,480 B2 * 3/2020 Jang ..................... H04W 56/001
11,178,656 B2 * 11/2021 Jang ...................... H04L 1/1883
(Continued)

FOREIGN PATENT DOCUMENTS

CA        3082719 A1 *  5/2019  ........... H04W 56/00
CN      103796296 A    5/2014
(Continued)

OTHER PUBLICATIONS

3GPP TR 23.700-20 V0.2.0:"3rd Generation Partnership Project;Technical Specification Group Services and System Aspects;Study on enhanced support of Industrial Internet of Things (IIoT) in 5G System(Release 17)",Dec. 2019,total 18 pages.

*Primary Examiner* — Wutchung Chu
*Assistant Examiner* — Berhanu D Belete

(57) ABSTRACT

This application provides a time synchronization method, an access network device, a communication apparatus, a computer storage medium, and a communication system. The method includes: A first access network device obtains first indication information, where the first indication information is used to indicate that a first terminal has a requirement for receiving or sending an uplink time synchronization message, and/or the indication information is used to indicate a precision requirement for time synchronization between the first terminal and a wireless network. The first access network device performs time synchronization on the first terminal based on the first indication information. This can avoid a case in which a requirement on a synchronization error of a time sensitive network TSN in an uplink time synchronization scenario cannot be met due to an excessively large air interface synchronization error, so that synchronization between TSN devices is improved, and TSN performance is improved.

8 Claims, 9 Drawing Sheets

(56)     References Cited

U.S. PATENT DOCUMENTS

| | | | |
|---|---|---|---|
| 2012/0257570 A1* | 10/2012 | Jang | H04W 72/23 |
| | | | 370/328 |
| 2014/0050186 A1* | 2/2014 | Kim | H04L 5/0078 |
| | | | 370/329 |
| 2014/0056251 A1* | 2/2014 | Ahn | H04W 52/146 |
| | | | 370/329 |
| 2014/0161110 A1* | 6/2014 | Kim | H04L 5/0028 |
| | | | 370/336 |
| 2015/0085839 A1* | 3/2015 | Bergstrom | H04W 56/0045 |
| | | | 370/336 |
| 2015/0223124 A1 | 8/2015 | Wang et al. | |
| 2019/0064873 A1 | 2/2019 | Carlstedt et al. | |
| 2019/0090262 A1* | 3/2019 | Yan | H04W 72/23 |
| 2019/0174364 A1* | 6/2019 | Jin | H04W 36/0058 |
| 2020/0196262 A1* | 6/2020 | Kwon | H04W 74/006 |
| 2020/0205139 A1* | 6/2020 | Jang | H04W 72/0446 |
| 2021/0367817 A1* | 11/2021 | Dinan | H04L 5/0035 |
| 2022/0078771 A1* | 3/2022 | Jang | H04W 52/0219 |

FOREIGN PATENT DOCUMENTS

| | | | |
|---|---|---|---|
| CN | 110167130 A | 8/2019 | |
| CN | 110167132 A | 8/2019 | |
| CN | 110662283 A | 1/2020 | |
| WO | 2019125396 A1 | 6/2019 | |
| WO | 2019132861 A1 | 7/2019 | |
| WO | 2019243669 A1 | 12/2019 | |

* cited by examiner

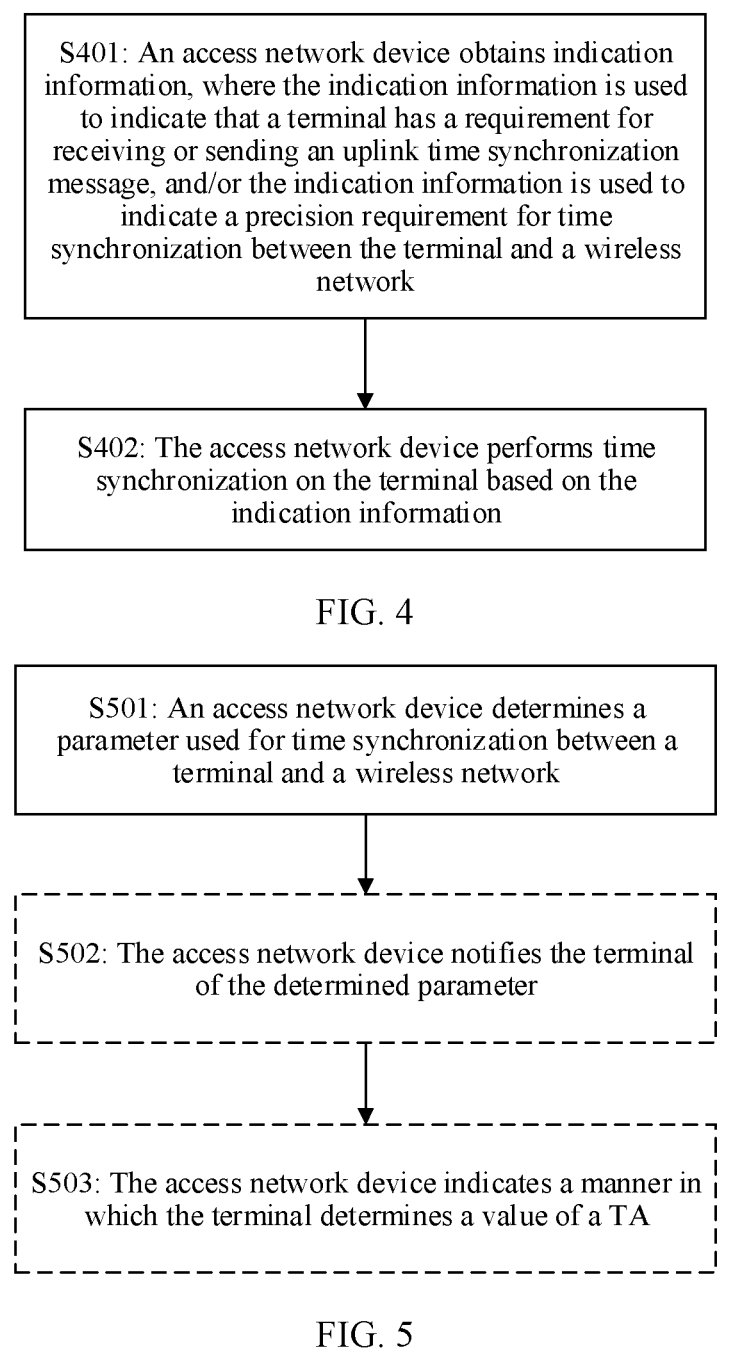

S401: An access network device obtains indication information, where the indication information is used to indicate that a terminal has a requirement for receiving or sending an uplink time synchronization message, and/or the indication information is used to indicate a precision requirement for time synchronization between the terminal and a wireless network S402: The access network device performs time synchronization on the terminal based on the indication information

FIG. 4

S501: An access network device determines a parameter used for time synchronization between a terminal and a wireless network S502: The access network device notifies the terminal of the determined parameter S503: The access network device indicates a manner in which the terminal determines a value of a TA

FIG. 5

| TA_step | Timing Advance Command | |
|---|---|---|
| Timing Advance Command | | UL grant |
| UL grant | | |
| ULgrant | | |
| ULgrant | | |
| Temporary UL grant | | |
| Temporary UL grant | | |

FIG. 5-1

| TA_step | Timing Advance Command | |
|---|---|---|
| Timing Advance Command | | UL grant |
| UL grant | | |
| ULgrant | | |
| ULgrant | | |
| Temporary UL grant | | |
| Temporary UL grant | | |
| Scaling factor | | |

FIG. 5-2

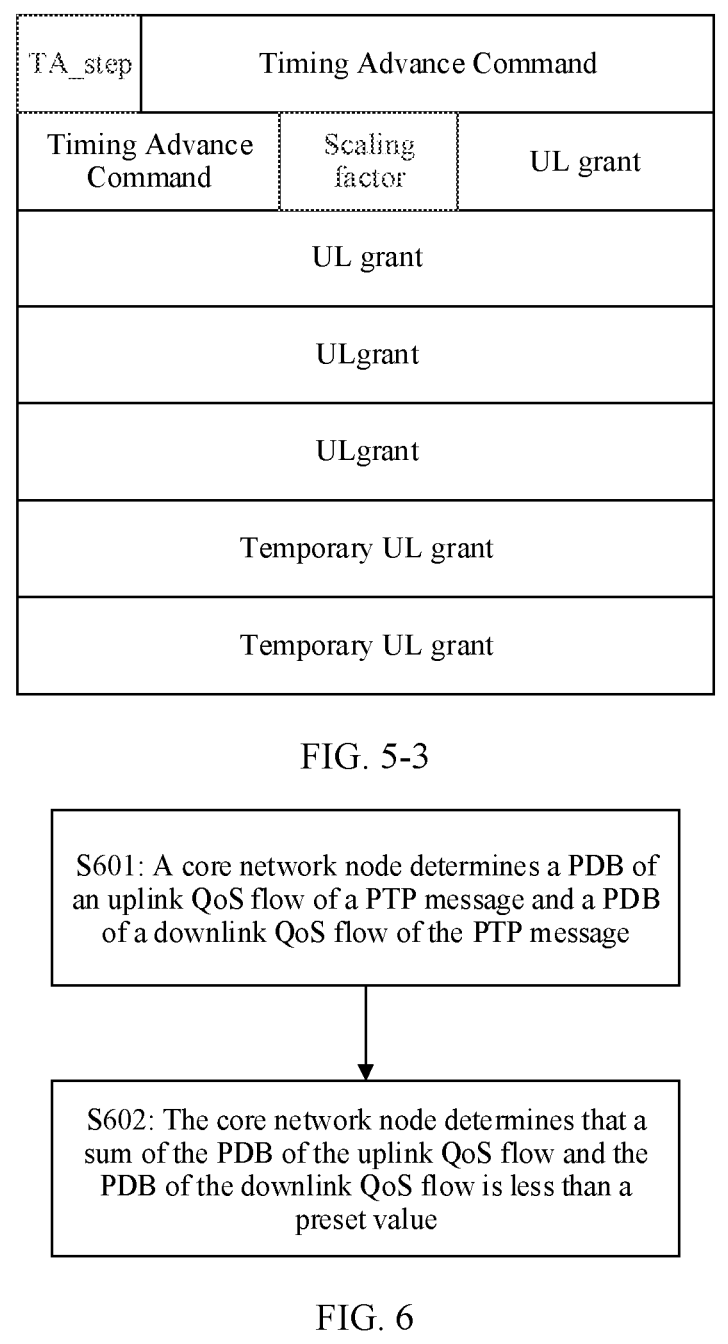

| TA_step | Timing Advance Command | |
|---|---|---|
| Timing Advance Command | Scaling factor | UL grant |
| UL grant | | |
| ULgrant | | |
| ULgrant | | |
| Temporary UL grant | | |
| Temporary UL grant | | |

FIG. 5-3

S601: A core network node determines a PDB of an uplink QoS flow of a PTP message and a PDB of a downlink QoS flow of the PTP message S602: The core network node determines that a sum of the PDB of the uplink QoS flow and the PDB of the downlink QoS flow is less than a preset value

FIG. 6

TIME SYNCHRONIZATION METHOD, ACCESS NETWORK DEVICE, COMMUNICATION APPARATUS, COMPUTER STORAGE MEDIUM, AND COMMUNICATION SYSTEM

CROSS-REFERENCE TO RELATED APPLICATIONS

This application is a continuation of International Patent Application No. PCT/CN2020/074006, filed on Jan. 23, 2020. The disclosure of the aforementioned application is hereby incorporated by reference in its entirety.

TECHNICAL FIELD

This application relates to the communication field, and in particular, to a time synchronization method, an access network device, a communication apparatus, a computer storage medium, and a communication system.

BACKGROUND

To resolve problems such as high costs and poor flexibility in deployment of a time sensitive network (TSN) carried on a wired network, a 5G system (5G system, the 5th generation system) may be used as a TSN bridge (TSN bridge) device, to transmit a service data packet of the TSN via the 5G system.

The TSN is mainly used in a scenario that has a high requirement for synchronization between TSN devices, such as industrial control. Therefore, time synchronization needs to be provided for the TSN device, such as a TSN slave. Specifically, a downlink time synchronization manner or an uplink time synchronization manner may be used. The downlink time synchronization manner means that a grandmaster clock located outside a user plane function (user plane function, UPF) entity of the 5G system provides time synchronization to the TSN slave connected to UE. The uplink time synchronization manner means that the grandmaster clock located on the TSN slave connected to the UE provides time synchronization for a TSN slave outside the UPF or a TSN slave connected to another UE.

However, currently, how to meet a requirement on synchronization between a TSN master and a TSN slave is not considered in discussion of the uplink time synchronization manner.

SUMMARY

Embodiments of this application provide a time synchronization method, an access network device, a communication apparatus, a computer storage medium, and a communication system, to improve synchronization between TSN devices.

According to a first aspect, this application provides a time synchronization method, including: A first access network device obtains first indication information, where the first indication information is used to indicate that a first terminal has a requirement for receiving and/or sending an uplink time synchronization message, and/or the indication information is used to indicate a precision requirement for time synchronization between the first terminal and a wireless network, and/or the first indication information is used to indicate that the uplink time synchronization message received and/or sent by the first terminal needs to be transmitted through local switching (local switching/local switch) via a core network node. The first access network device performs time synchronization on the first terminal based on the first indication information.

The uplink time synchronization message may be generated by a TSN grandmaster clock connected to the first terminal, and transmitted to a TSN node over the wireless network in which the first terminal is located.

The precision requirement for time synchronization between the first terminal and the wireless network includes a precision requirement for time synchronization between the first terminal and the first access network device.

According to the time synchronization method provided in the first aspect, an access network device obtains information about whether a terminal requires high-precision time synchronization or whether the terminal is used in an uplink time synchronization scenario, and then performs a time synchronization operation on the terminal. This can avoid a case in which a requirement on a synchronization error of a TSN in the uplink time synchronization scenario cannot be met due to an excessively large air interface synchronization error, so that synchronization between TSN devices is improved, and TSN performance is improved.

In a possible implementation of the first aspect, that a first access network device obtains first indication information includes: The first access network device receives the first indication information from a first core network node.

The first indication information may be sent by a second core network node to the first core network node by using signaling.

In a possible implementation of the first aspect, that the first access network device obtains first indication information includes: The first access network device receives the first indication information from a second access network device, where the first access network device is a target base station to which the first terminal is handed over, and the second access network device is a source base station from which the first terminal is handed over.

In a possible implementation of the first aspect, the access network device includes a centralized unit (centralized unit, CU) and a distributed unit (distributed unit, DU), and that the first access network device obtains first indication information includes: The CU receives the first indication information from the first core network node or the second access network device. The CU indicates the first indication information to the DU. Therefore, the DU may perform the time synchronization operation on the first terminal based on an indication of the CU. For example, the DU sends a timing advance command (timing advance command, TAC) of a specific length to the first terminal.

In a possible implementation of the first aspect, that a first access network device obtains first indication information includes: The first access network device receives the first indication information from the first terminal. If the access network device includes the CU and the DU, that the first access network device obtains first indication information includes: The DU receives the first indication information from the terminal. The DU indicates the first indication information to the CU. Further, if the first access network device is used as a source access network device to which the terminal is handed over, the CU of the first access network device may indicate the first indication information to a target access network device.

In a possible implementation of the first aspect, the performing time synchronization on the first terminal includes: The access network device determines a parameter used for time synchronization between the first terminal and the wireless network. Further, the access network device may notify the first terminal of the parameter.

Optionally, the parameter includes an adjustment step of a timing advance (timing advance, TA) of the first terminal, and/or a subcarrier spacing.

In a possible implementation of the first aspect, if the parameter includes the adjustment step of the TA, the access network device may indicate a manner in which the first terminal determines a value of the TA.

In a possible implementation of the first aspect, that the access network device indicates a manner in which the first terminal determines a value of the TA includes: The access network device sends second indication information to the first terminal, where the second indication information is used to indicate the first terminal to determine the value of the TA based on the adjustment step of the TA and/or an adjusted length of a TAC that are/is indicated by the access network device or based on a predefined adjustment step of the TA and/or a predefined adjusted length of the TAC.

In a possible implementation of the first aspect, that the access network device indicates a manner in which the first terminal determines a value of the TA includes: The access network device sends second indication information to the first terminal, where the second indication information is used to indicate the first terminal whether to determine the value of the TA based on the adjustment step of the TA and/or an adjusted length of a TAC that are/is indicated by the access network device or based on a predefined adjustment step of the TA and/or a predefined adjusted length of the TAC.

In a possible implementation of the first aspect, that the access network device indicates a manner in which the first terminal determines a value of the TA includes: The access network device sends second indication information to the first terminal, where the second indication information is used to indicate a scale factor, and the scale factor is used to determine the value of the TA.

Optionally, the second indication information is included in a physical downlink control channel (physical downlink control channel, PDCCH) order, or format information of a PDCCH order, or included in a handover message, or included in a random access response (random access response, RAR) message.

In a possible implementation of the first aspect, that the first indication information is used to indicate that a first terminal has a requirement for receiving or sending an uplink time synchronization message includes: The first indication information is used to indicate the first terminal to send the uplink time synchronization message to a second terminal over the wireless network in which the first access network device is located. Alternatively, the first indication information is used to indicate the first terminal to receive the uplink time synchronization message that is of the second terminal and that is forwarded by the wireless network. In the foregoing process, a core network element in the wireless network may transmit the uplink time synchronization message through local switching, to be specific, after receiving the uplink time synchronization message from a terminal device, the core network element forwards the uplink time synchronization message to another terminal device in a downlink transmission manner.

In a possible implementation of the first aspect, a sum of a packet delay budget (packet delay budget, PDB) of an uplink quality of service flow (quality of service, QoS flow) and a PDB of a downlink QoS flow is less than a preset value, where the uplink QoS flow is used to send the uplink time synchronization message, and the downlink QoS flow is used to forward the uplink time synchronization message.

The PDB of the uplink QoS flow includes any combination of duration in which the uplink time synchronization message stays in a translator of the first terminal, duration in which the uplink time synchronization message stays in the first terminal, duration in which the uplink time synchronization message is transmitted from the first terminal to a user plane function (user plane function, UPF) entity, and duration in which the UPF performs uplink processing on the uplink time synchronization message. The PDB of the downlink QoS flow includes any combination of duration in which the uplink time synchronization message stays in a translator of the second terminal, duration in which the uplink time synchronization message stays in the second terminal, duration in which the uplink time synchronization message is transmitted from the second terminal to the UPF, and duration in which the UPF performs downlink processing on the uplink time synchronization message. The first terminal is a transmit end of the uplink time synchronization message, and the second terminal is a receive end of the uplink time synchronization message.

According to a second aspect, an embodiment of this application provides a time synchronization method. The method includes: An access network device determines a parameter used for time synchronization between a terminal and a wireless network. The access network device notifies the terminal of the determined parameter.

In a possible implementation of the second aspect, when the parameter includes an adjustment step of a TA, the method may further include: The access network device indicates a manner in which the terminal determines a value of the TA.

In a possible implementation of the second aspect, that the access network device indicates a manner in which the first terminal determines a value of the TA includes: The access network device sends indication information to the first terminal, where the indication information is used to indicate the first terminal to determine the value of the TA based on the adjustment step of the TA and/or an adjusted length of a TAC that are/is indicated by the access network device or based on a predefined adjustment step of the TA and/or a predefined adjusted length of the TAC.

In a possible implementation of the second aspect, that the access network device indicates a manner in which the first terminal determines a value of the TA includes: The access network device sends indication information to the first terminal, where the indication information is used to indicate the first terminal whether to determine the value of the TA based on the adjustment step of the TA and/or an adjusted length of a TAC that are/is indicated by the access network device or based on a predefined adjustment step of the TA and/or a predefined adjusted length of the TAC.

In a possible implementation of the second aspect, that the access network device indicates a manner in which the first terminal determines a value of the TA includes: The access network device sends indication information to the first terminal, where the indication information is used to indicate a scale factor, and the scale factor is used to determine the value of the TA.

Optionally, the indication information is included in a PDCCH order, or format information of a PDCCH order, or included in a handover message, or included in a RAR message.

According to the time synchronization method provided in the second aspect, the access network device indicates, to the terminal, the time synchronization parameter determined for the terminal, so as to assist in implementing high-precision time synchronization between the terminal and the wireless network. As an air interface synchronization error is further reduced, a requirement on a synchronization error of a TSN in an uplink time synchronization scenario may be met, and TSN performance may be improved.

According to a third aspect, an embodiment of this application provides a communication apparatus. The apparatus has a function of implementing actions of the access network device according to the time synchronization method shown in the first aspect. The function may be implemented by hardware, or may be implemented by hardware by executing corresponding software. The hardware or software includes one or more units or means (means) corresponding to the function.

In a possible design, the apparatus includes a processor. The processor is configured to support the apparatus in performing a corresponding function of the access network device according to the time synchronization method shown in the first aspect or the second aspect. The apparatus may further include a memory. The memory may be coupled to the processor, and the memory stores program instructions and data that are necessary for the apparatus. Optionally, the apparatus further includes a transceiver. The transceiver is configured to support communication between the apparatus and a network device, for example, a terminal, another access network device, or a core network node. The transceiver may be an independent receiver, an independent transmitter, or a transceiver integrating transmission and reception functions.

In a possible implementation, the communication apparatus may be an access network device, or a component that can be used in the access network device, for example, a chip, a chip system, or a circuit.

According to a fourth aspect, an embodiment of this application provides a time synchronization method, including the following steps.

A core network node determines a PDB of an uplink QoS flow of a high precision time protocol (Precision Time Protocol, PTP) message and a PDB of a downlink QoS flow of the PTP message, and determines that a sum of the PDB of the uplink QoS flow and the PDB of the downlink QoS flow is less than a preset value. The PTP message includes an uplink time synchronization message. The uplink QoS flow is used to send the uplink time synchronization message, and the downlink QoS flow is used to forward the uplink time synchronization message.

Optionally, the PDB of the uplink QoS flow includes any combination of duration in which the PTP message stays in a translator of the first terminal, duration in which the PTP message stays in the first terminal, duration in which the PTP message is transmitted from the first terminal to a UPF, and duration in which the UPF performs uplink processing on the PTP message, where the first terminal is configured to send the uplink time synchronization message.

Optionally, the PDB of the downlink QoS flow includes any combination of duration in which a UPF performs downlink processing on the PTP message, duration in which the PTP message is transmitted from the UPF to a second terminal, duration in which the PTP message stays in the second terminal, and duration in which the PTP message stays in a translator of the second terminal, where the second terminal is configured to receive the uplink time synchronization message forwarded by a wireless network.

In a possible implementation, the core network node determines different values of the PDB of the downlink QoS flow based on usage of the downlink QoS flow. Optionally, when the downlink QoS flow is used to transmit a downlink time synchronization message, a processing unit determines that the PDB of the downlink QoS flow includes duration in which the PTP message stays in an NW-TT and duration in which the PTP message stays in the UPF. Optionally, when the downlink QoS flow is used to forward the uplink time synchronization message, the PDB of the downlink QoS flow includes duration in which the UPF performs downlink processing on the PTP message, duration in which the PTP message is transmitted from the UPF to the UE 2, and duration in which the PTP message stays in the UE 2.

In a possible implementation, the core network node determines whether the PDP message is to be forwarded to another terminal via the UPF, and the core network node sets the PDB of the uplink QoS flow to different values based on determining results.

According to the time synchronization method provided in the fourth aspect, it can be ensured that duration in which the uplink time synchronization message stays in a 5G system meets a requirement on stay duration of a transparent clock specified in the PTP protocol, so that an extra error caused by excessively long stay duration of the uplink time synchronization message in the 5G system is avoided.

According to a fifth aspect, an embodiment of this application provides a communication apparatus. The apparatus has a function of implementing actions of the core network node according to the time synchronization method shown in the fourth aspect. The function may be implemented by hardware, or may be implemented by hardware by executing corresponding software. The hardware or software includes one or more units or means (means) corresponding to the function.

In a possible design, the apparatus includes a processor. The processor is configured to support the apparatus in performing a corresponding function of the core network node according to the foregoing time synchronization method. The apparatus may further include a memory. The memory may be coupled to the processor, and the memory stores program instructions and data that are necessary for the apparatus. Optionally, the apparatus further includes a transceiver. The transceiver is configured to support communication between the apparatus and a network device, for example, a terminal, an access network device, or a core network node. The transceiver may be an independent receiver, an independent transmitter, or a transceiver integrating transmission and reception functions.

In a possible implementation, the communication apparatus may be a core network node, or a component that can be used in the core network node, for example, a chip, a chip system, or a circuit.

The core network node may be a session management function (session management function, SMF) node.

According to a sixth aspect, an embodiment of this application provides a communication system, including an access network device and a core network device that are configured to perform the method according to the first aspect or the second aspect.

Optionally, the core network device may perform the time synchronization method according to the fourth aspect.

Optionally, the communication system further includes a TSN master and a TSN slave.

According to a seventh aspect, an embodiment of this application provides a computer-readable storage medium, where the computer-readable storage medium stores instructions; and when the instructions are run on a computer, the computer is enabled to perform the time synchronization method according to any one of the foregoing aspects.

According to an eighth aspect, an embodiment of this application provides a computer program product, where the computer program product stores instructions; and when the instructions are run on a computer, the computer is enabled to perform the time synchronization method according to any one of the foregoing aspects.

BRIEF DESCRIPTION OF DRAWINGS

To describe technical solutions in embodiments of this application more clearly, the following briefly describes the accompanying drawings used in describing embodiments. It is clear that the accompanying drawings in the following descriptions show merely some embodiments of this application, and a person of ordinary skill in the art may still derive other drawings from these accompanying drawings without creative efforts.

FIG. 4 is a schematic flowchart of a time synchronization method according to an embodiment of this application;

FIG. 5 is a schematic flowchart of a time synchronization method according to an embodiment of this application;

FIG. 5-1 to FIG. 5-3 are schematic diagrams of formats of a RAR message according to an embodiment of this application;

FIG. 6 is a schematic flowchart of a time synchronization method according to an embodiment of this application;

DESCRIPTION OF EMBODIMENTS

Figure 1:
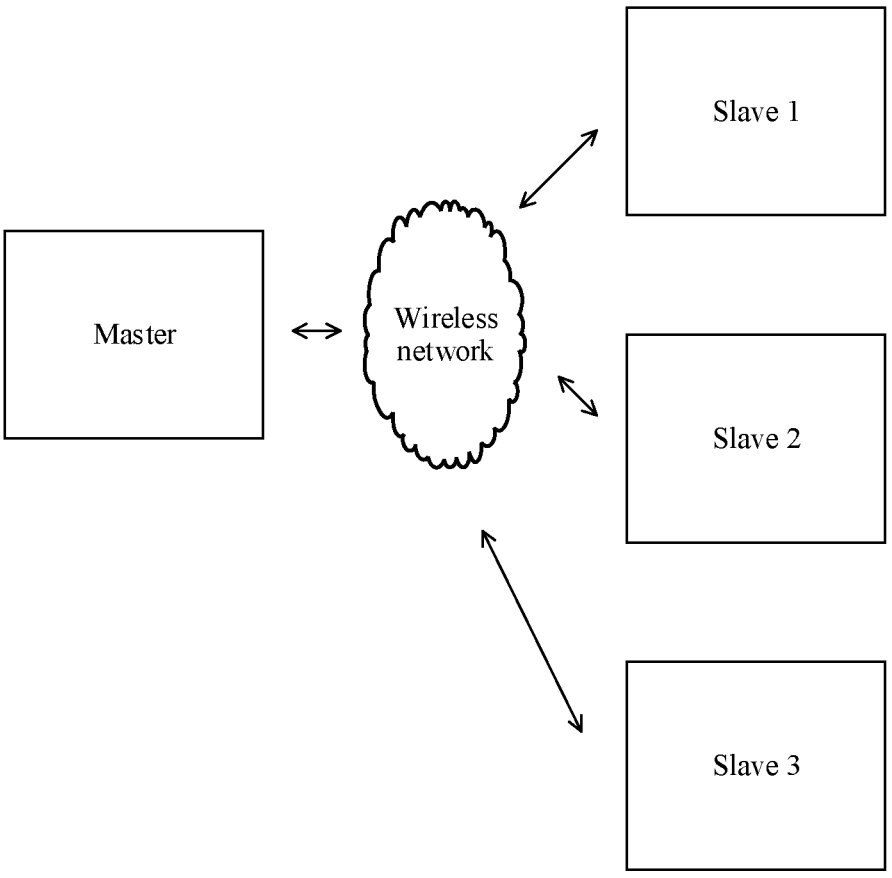
FIG. 1 is a schematic diagram of an industrial control system implemented by using a wireless network according to an embodiment of this application.

FIG. 1 is a schematic diagram of an industrial control system implemented by using a wireless network according to an embodiment of this application.

As shown in FIG. 1, the industrial control system includes a master (master) and a slave (slave). Three slaves represented as Slave 1 to 3 are used as an example herein. More or fewer slave stations are similar to this, and details are not described again. Transmission between the Master and the Slave 1 to 3 can be implemented via the wireless network.

Figure 2:
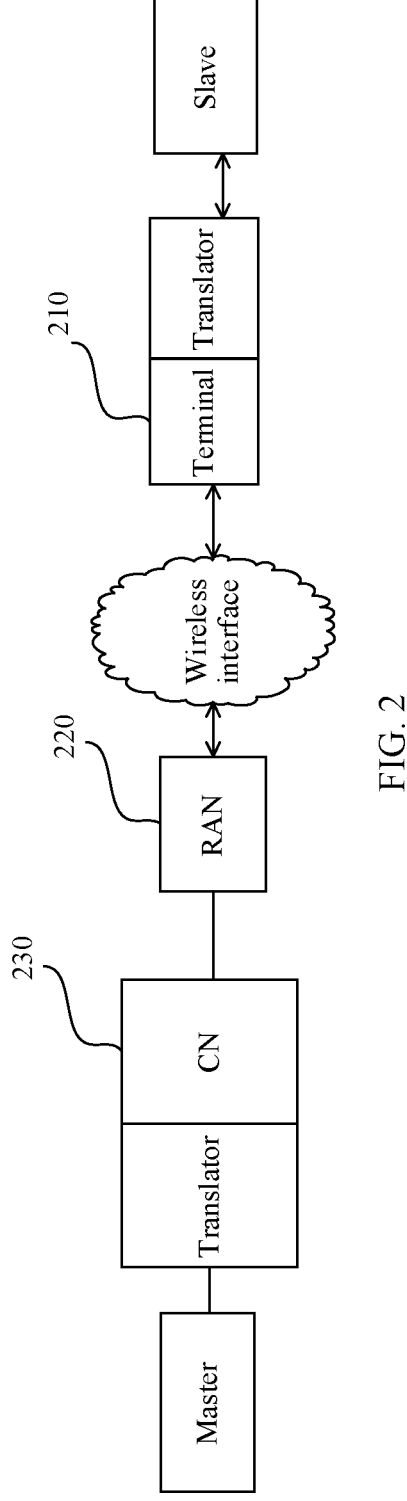
FIG. 2 is a schematic diagram of a wireless communication network used in an industrial control system according to an embodiment of this application.

FIG. 2 is a schematic diagram of a wireless communication network used in an industrial control system according to an embodiment of this application. As shown in FIG. 2, a terminal 210 accesses a wireless network through a wireless interface (for example, an air interface), to communicate with another device, such as a master, over the wireless network. The wireless network includes a radio access network (radio access network, RAN) 220 and a core network (CN) 230. The RAN 220 is configured to connect the terminal 210 to the wireless network, and the CN 230 is configured to manage the terminal and provide the terminal with a gateway for communicating with the another device. The terminal may be a device with a wireless communication function. The terminal may be connected to a slave in the foregoing control system via a translator, to receive data sent by the master to the slave, and send the data to the slave over the wireless network; or to send, to the master, data sent by the slave to the master over the wireless network.

It may be understood that, a case that there is only one slave is used as an example in FIG. 2. When there are a plurality of slaves, each slave may be connected to the terminal via a translator, or each slave may integrate a component with a wireless communication function (for example, a chip), to access the wireless network through a wireless interface.

The terminal and the slave may be integrated into one physical entity. For example, a component with a wireless communication function (for example, a chip) may be integrated into the Slave 1 in FIG. 1 or a slave in FIG. 2. In this case, the slave integrates the wireless communication function and a function of performing an operation based on instructions of an industrial control terminal.

In an industrial control scenario, control signaling from a master (for example, a console) may be sent to a slave (for example, an operating arm) within specified time, and the slave may perform a corresponding action at a specified time point. Therefore, the industrial control system may be implemented by using a TSN. To support time-based control, precise synchronization between TSN devices is required. Currently, the PTP or the Institute of Electrical and Electronics Engineers (Institute of Electrical and Electronics Engineers, IEEE) protocol is usually used in the TSN to implement precise time synchronization between TSN devices. Time synchronization signaling that is specified by the PTP and that is used for synchronization between PTP devices is also called a PTP message/PTP packet. Therefore, data transmitted in the TSN network may be classified into two types: a PTP message used for time synchronization (time synchronization) and a service-related data packet. The PTP message used for time synchronization is a message generated by a TSN grandmaster clock (grandmaster clock, GM) and sent to a TSN slave to perform TSN clock synchronization.

In a TSN in which a 5G system is used provided in this application, a scenario in which a TSN grandmaster clock is connected to a terminal accessing the 5G system is referred to as an uplink time synchronization scenario, and a PTP message transmitted in the uplink time synchronization scenario is referred to as an uplink time synchronization message. A scenario in which the TSN grandmaster clock is connected to a core network node in the 5G system is referred to as a downlink time synchronization scenario, and a PTP message transmitted in the downlink time synchronization scenario is referred to as a downlink time synchronization message, where the core network node may be a user plane function (user plane function, UPF) node. When a current error of time synchronization over a 5G air interface is about 540 ns (ns), in a solution in which the 5G system supports the TSN, a requirement for TSN time synchronization is that a synchronization error between the TSN GM and the TSN slave should be within 1 μs (μs).

Figure 3:
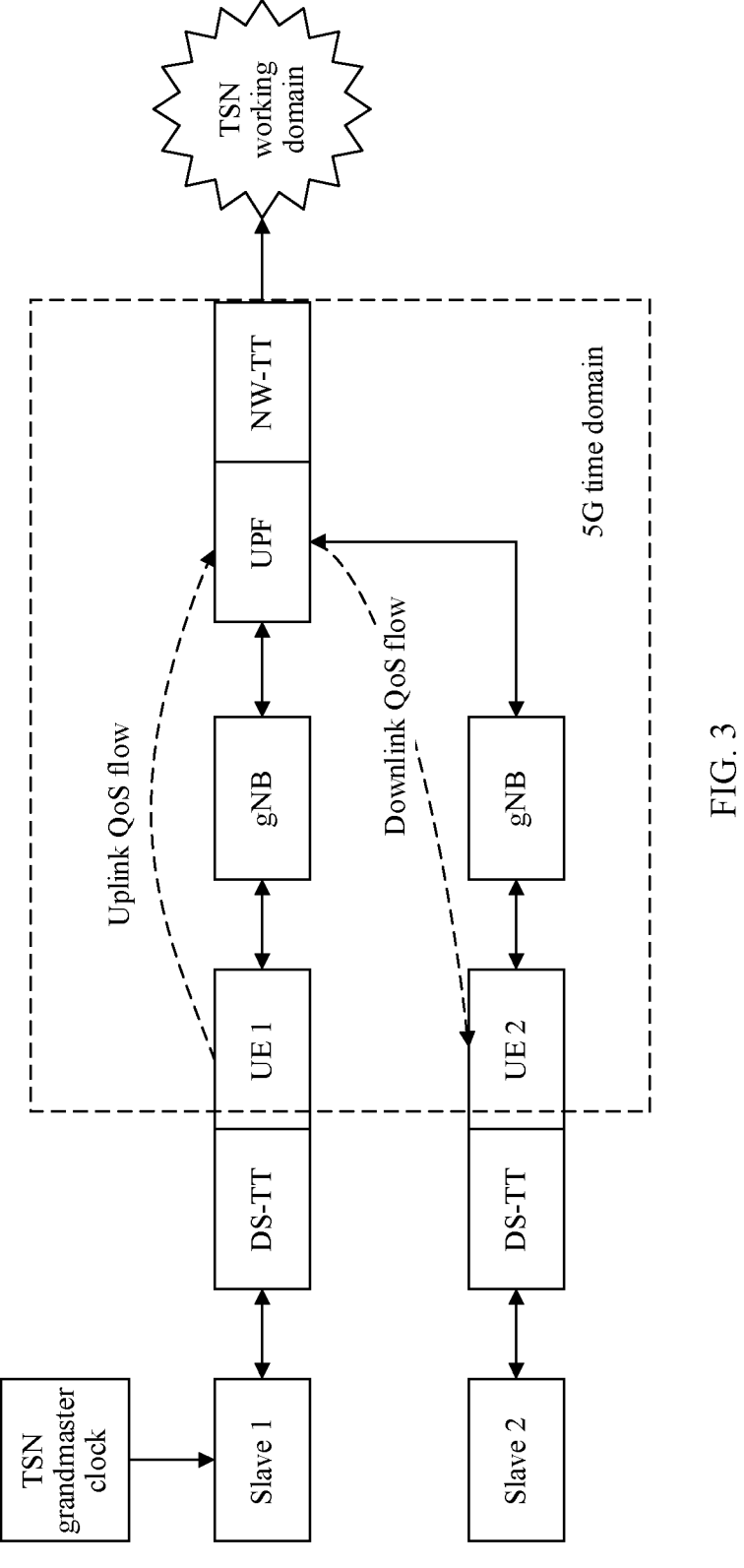
FIG. 3 is a schematic diagram of an uplink time synchronization scenario of a TSN in which a 5G system is used according to an embodiment of this application.

FIG. 3 is a schematic diagram of an uplink time synchronization scenario of a TSN in which a 5G system is used according to an embodiment of this application.

As shown in FIG. 3, UE 1 is connected to a TSN slave (slave 1), and a TSN grandmaster clock is located on the TSN slave. When the UE 1 performs, via the grandmaster clock, TSN time synchronization on another TSN slave (slave 2) connected to UE 2, a transmission path of a PTP message is from UE 1 to a UPF to UE 2 (UE 1→UPF→UE 2). To be specific, the PTP message is first sent by UE 1 to the UPF through an uplink QoS flow, where the UPF includes a network-side TSN translator (network-side TSN translator, NW-TT), and then the PTP message is sent to UE 2 by the UPF through a downlink QoS flow. Compared with a downlink time synchronization scenario, in the uplink time synchronization scenario, duration in which the PTP message stays in the 5G system is doubled. According to the IEEE protocol (802.1AS), if a PDB corresponding to a QoS flow for transmitting a PTP message is less than a preset value (Rth), a requirement on the duration in which the PTP message stays in the 5GS defined by the IEEE cannot be met in the uplink time synchronization scenario.

In addition, when the PTP message enters the 5G system via a device-side TSN translator (device-side TSN Translator, DS-TT) of UE 1, the DS-TT of UE 1 adds a 5G timestamp Tin, and the DS-TT of UE 2 sends the PTP message at 5G time Tout. In this case, the DS-TT of UE 2 adds a value of Tout-Tin, which indicates the duration in which the PTP message stays in the 5G system, to a correctionField field of the PTP message. Because a synchronization error between UE 1 and a gNB is Δ1, and a synchronization error between UE 2 and the gNB is Δ1, a synchronization error between UE 1 and UE 2 is at least 2*Δ1>1 µs.

In the 5G system, an uplink TA mechanism may be used for synchronization between a terminal and an access network device. From the perspective of a terminal side, a TA refers to a negative offset (a value of the TA) between start time of receiving a downlink subframe and time of transmitting an uplink subframe. The access network device may control, by properly controlling offsets of terminals, time at which uplink signals from different terminals arrive at the access network device. Generally, the access network device may send a timing advance command (timing advance command, TAC) to the UE in the following two manners, to indicate and adjust the value of the TA of the terminal.

1. In a random access process, the access network device determines the value of the TA by measuring a received preamble (preamble), and sends the value of the TA to the UE based on a TAC field of a RAR message. A length of the TAC field in the RAR message may be defined as 12 bits, and a corresponding range of a TA index value $T_A$ is 0 to 3846. The value that is of the TA and that is indicated by the access network device is TA*step, where step=16*64$T_c$/2, and is an adjustment granularity/step of the TA, $T_c$ is a minimum time unit defined in the 5G system, a value of p is related to a subcarrier spacing (subcarrier spacing, SCS) corresponding to a first uplink transmission message that is after the RAR message, and 2=SCS/15 kHz. If SCS=15 kHz, $2^\mu$=1; if SCS=30 kHz, $2^\mu$=2; and so on. Therefore, when the SCS corresponding to the first uplink transmission message that is after the RAR message is equal to 15 kHz, the adjustment step of the TA is 520.83 ns.

2. The access network device determines a value of a TA of each terminal by measuring an uplink transmission signal of the corresponding terminal. If a specific terminal needs to correct a value of a TA, the access network device sends a media access control control element (media access control control element, MAC CE) including the TAC to the terminal, to require the terminal to adjust an uplink TA. The MAC CE includes a 2-bit TA group identifier (TA group identifier, TAG ID) and a 6-bit TAC field, where a value range indicated by the TAC field is 0 to 63. Based on a previous value TA$_{old}$ of the TA and a $T_A$ indicated in the TAC, the terminal calculates the latest value TA$_{new}$ according to the following formula: TA$_{new}$=TA$_{old}$+(T$_A$−31)*step, where step=16*64$T_c$/2$^\mu$, and is the adjustment granularity/step of the TA. In this case, µ is related to a maximum SCS in a plurality of activated uplink bandwidth parts (bandwidth parts, BWPs) in a TAG, and 2$^\mu$=SCS/15 kHz. When the maximum SCS in the activated uplink BWPs in the TAG is 15 kHz, step=520.83 ns.

In embodiments of this application, a terminal, also referred to as a terminal apparatus or user equipment (user equipment, UE), is an apparatus with a wireless communication function, and may be connected to a slave. The terminal may be independent of the slave, or may be integrated with the slave. When the terminal is disposed independently, the terminal may refer to an apparatus that has a wireless communication function, may be connected to the slave, and is configured to connect the slave to a wireless network. When the terminal is integrated with the slave, the terminal may refer to an apparatus that integrates a slave physical entity and a wireless communication function, for example, a chip or a system-on-a-chip. The terminal may be a wireless terminal in industrial control (industrial control), or may be a terminal having a similar requirement in another control system, for example, a wireless terminal in self driving (self driving), a wireless terminal in remote surgery (remote surgery), a wireless terminal in a smart grid (smart grid), a wireless terminal in transportation safety (transportation safety), a wireless terminal in a smart city (smart city), or a wireless terminal in a smart home (smart home).

An access network device is a device in the wireless network, for example, a radio access network (radio access network, RAN) node that connects a terminal apparatus to the wireless network. Currently, some examples of the RAN node are: a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), and a wireless fidelity (wireless fidelity, Wi-Fi) access point (access point, AP). In a network structure, the access network device may include a centralized unit (centralized unit, CU) node, a distributed unit (distributed unit, DU) node, or a RAN device including the CU node and the DU node.

A radio access network in this application may be a long term evolution (long term evolution, LTE) wireless communication system, a 5th generation (5th generation, 5G) mobile communication system, such as a new radio (new radio, NR) system, or another next generation (next generation, NG) communication system. This is not limited in this application.

In a network architecture, the RAN includes a baseband apparatus and a radio frequency apparatus. The baseband apparatus may be implemented by one node, or may be implemented by a plurality of nodes. The radio frequency apparatus may be implemented remotely and independently from the baseband apparatus, may be integrated into the baseband apparatus, or may be partially implemented remotely and partially integrated into the baseband apparatus. For example, the RAN may include a baseband apparatus and a radio frequency apparatus. The radio frequency apparatus may be remotely disposed relative to the baseband apparatus. For example, a remote radio unit (remote radio unit, RRU) is remotely disposed relative to a BBU.

Communication between the RAN and the terminal complies with a specific protocol layer structure. For example, a control plane protocol layer structure may include functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure may include functions of protocol layers such as a PDCP layer, an RLC layer, a MAC layer, and a physical layer. In an implementation, a service data application protocol (service data adaptation protocol, SDAP) layer may further be included above the PDCP layer. Functions of these protocol layers may be implemented by one node, or may be implemented by a plurality of nodes. For example, in the evolved structure, the RAN may include the centralized unit (centralized unit, CU) and the distributed unit (distributed unit, DU), and one CU may perform centralized control on a plurality of DUs. Division may be performed for the CU and the DU based on a protocol layer of a wireless network. For example, the functions of the PDCP layer and the protocol layers above the PDCP layer are set on the CU, and the functions of the protocol layers below the PDCP layer such as the RLC layer and the MAC layer are set on the DU. Division into the protocol layers is merely an example, and division may alternatively be performed based on another protocol layer, for example, based on the RLC layer. The functions of the RLC layer and the layers above the RLC layer are set on the CU, and the functions of the protocol layers below the RLC layer are set on the DU. Alternatively, division is performed at a protocol layer. For example, some functions of the RLC layer and the functions of the protocol layers above the RLC layer are set on the CU, and a remaining function of the RLC layer and the functions of the protocol layers below the RLC layer are set on the DU. In addition, division may alternatively be performed in another manner. For example, division is performed based on a delay. A function whose processing time needs to satisfy a delay requirement is set on the DU, and a function whose processing time does not need to satisfy the delay requirement is set on the CU.

Optionally, the radio frequency apparatus may be remote from the DU, may be integrated into the DU, or may be partially remote from the DU and partially integrated into the DU. This is not limited herein.

Optionally, a control plane (CP) and a user plane (UP) of the CU may be further separated into different entities for implementation, and the different entities are a control plane CU entity (CU-CP entity) and a user plane CU entity (CU-UP entity).

In the foregoing network architecture, signaling generated by the CU may be sent to the terminal via the DU, or signaling generated by the terminal may be sent to the CU via the DU. The DU may transparently transmit the signaling to the terminal or the CU by directly encapsulating the signaling at a protocol layer without parsing the signaling. In the following embodiments, if transmission of such signaling between the DU and the terminal is described, sending or receiving the signaling by the DU is applicable to the foregoing scenario. For example, signaling at an RRC layer or a PDCP layer is finally processed as signaling at a PHY layer and sent to the terminal, or converted from received signaling at the PHY layer. In this architecture, the signaling at the RRC layer or the PDCP layer may also be considered as being sent by the DU, or sent by the DU and the radio frequency apparatus.

When the foregoing CU-DU structure is used, the access network device may be the CU node, the DU node, or the RAN device including the CU node and the DU node.

An apparatus in the following embodiments of this application may be located in different devices based on functions implemented by the apparatus. As defined in embodiments of this application, a one-way communication link from an access network to a terminal is a downlink, data transmitted on the downlink is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

A resource in embodiments of this application may also be referred to as a transmission resource, including one or more of a time domain resource, a frequency domain resource, and a code domain resource. The resource may be used to carry data or signaling in an uplink communication process or a downlink communication process.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

It should be understood that in embodiments of this application, "B corresponding to A" indicates that B is associated with A, and B may be determined based on A. However, it should be further understood that determining B based on A does not mean that B is determined based only on A. B may also be determined based on A and/or other information.

"A plurality of" in embodiments of this application refers to two or more than two.

Descriptions such as "first" and "second" in embodiments of this application are merely used for indicating and distinguishing between described objects, do not show a sequence, do not indicate a specific limitation on a quantity of devices in embodiments of this application, and cannot constitute any limitation on embodiments of this application.

"Connection" in embodiments of this application means various connection manners such as a direct connection or an indirect connection, for implementing communication between devices. This is not limited in embodiments of this application.

Unless otherwise specified, "transmit/transmission" (transmit/transmission) in embodiments of this application refers to bidirectional transmission, and includes a sending action and/or a receiving action. Specifically, "transmission" in embodiments of this application includes sending information, receiving information, or sending information and receiving data. In other words, information transmission herein includes uplink and/or downlink information transmission. Data information may include data, a channel, or a signal. The uplink information transmission includes uplink data transmission, uplink channel transmission, or uplink signal transmission. The downlink information transmission includes downlink data transmission, downlink channel transmission, or downlink signal transmission.

A service (service) in embodiments of this application is a communication service obtained by a terminal device from a network side, and includes a control plane service and/or a data plane service, for example, a voice service and a data traffic service. Sending or receiving of the service includes sending or receiving of service-related data (data) or signaling (signaling).

In embodiments of this application, a "network" and a "system" convey a same concept, and a communication system is a communication network.

It may be understood that, in embodiments of this application, the terminal, the access network device, or the core network node may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

FIG. 4 is a schematic flowchart of a time synchronization method according to this application. The method includes the following steps.

S401: An access network device obtains indication information, where the indication information is used to indicate that a terminal has a requirement for receiving and/or sending an uplink time synchronization message, and/or the indication information is used to indicate a precision requirement for time synchronization between the terminal and a wireless network, and/or the indication information is used to indicate that the time synchronization message received and/or sent by the terminal needs to be transmitted through local switching (local switching) via a core network node.

The access network device may be a base station. The terminal accesses the wireless network via the access network device. The wireless network includes an access network and a core network. The wireless network may be a 5G system, the access network device may be a gNB, and the core network may be a 5G core network (5G core network, 5GC).

That a terminal has a requirement for receiving and/or sending an uplink time synchronization message may also be understood as follows: The terminal is used in an uplink time synchronization scenario, which indicates a requirement for performing high-precision time synchronization between the terminal and the wireless network. Specifically, the terminal may be a terminal connected to a TSN grandmaster clock, and has a requirement for sending, over the wireless network accessed by the terminal, the uplink time synchronization message to a terminal connected to a TSN slave. Correspondingly, the indication information may be specifically used to indicate the terminal to send, over the wireless network in which the access network device is located, the uplink time synchronization message to the terminal connected to the TSN slave. Alternatively, the terminal may be a terminal connected to a TSN slave and has a requirement for receiving the uplink time synchronization message from a terminal connected to a grandmaster clock via the wireless network accessed by the terminal. Correspondingly, the indication information may be used to indicate the terminal to receive the uplink time synchronization message that is forwarded by the wireless network and that is sent by the terminal connected to the grandmaster clock.

The precision requirement for time synchronization between the terminal and the wireless network may be a precision requirement for time synchronization between the terminal and the access network device, or may be a precision requirement for time synchronization between the terminal and another network device in the wireless network, for example, a precision requirement for time synchronization between the terminal and a core network node. When the core network is the 5GC, the core network node may be a user plane function (user plane function, UPF) entity.

If the terminal has the requirement for receiving and/or sending the uplink time synchronization message, or the precision of time synchronization between the terminal and the wireless network is required to be less than a preset value, and/or the time synchronization message received and/or sent by the terminal needs to be transmitted through local switching (local switching) via the core network node, it indicates that the terminal has the requirement for performing high-precision time synchronization, or that high-precision time synchronization is to be performed between the terminal and the wireless network. Therefore, by obtaining the foregoing indication information, the access network device may determine whether the terminal needs to perform high-precision time synchronization with the wireless network, so as to perform a time synchronization operation for a terminal that has the requirement for performing high-precision time synchronization. Air interface synchronization between a terminal and a base station is used as an example herein. The high-precision time synchronization may refer to time synchronization with an error less than 1 µs. For ease of description, for the high-precision time synchronization mentioned in embodiments of this application, a time synchronization scenario in which an error is less than 1 µs is used as an example. Details are not described again.

S402: The access network device performs time synchronization on the terminal based on the indication information.

Optionally, the performing time synchronization on the terminal includes: determining a parameter used for time synchronization between the terminal and the wireless network. The parameter may include an adjustment step of a TA of the terminal. Specifically, when there is a specific subcarrier spacing, the access network device may not apply a common manner of determining a granularity/an adjustment step of the TA based on the subcarrier spacing, to generate a timing advance command (timing advance command, TAC). Instead, the access network device may use a smaller or finer adjustment step/granularity of the TA to generate the TAC. The smaller/finer adjustment step of the TA may be a predefined or preset value designed based on the requirement for time synchronization between the terminal and the wireless network in the 5G system, or a value determined by the access network device. For example, in the common manner, when there is an SCS of 15 kHz (for example, during initial random access, a subcarrier spacing for sending a msg3 is 15 kHz, or when the access network device adjusts a TA for a TA group, a maximum subcarrier spacing of activated BWPs in the TAG is 15 kHz), the granularity of the TA used by the base station to generate the TAC is 520.83 ns. However, when the access network device uses a smaller granularity of the TA to generate and send the TAC, for example, when the granularity of the TA determined or predefined by the access network device is 100 ns, and when there is a subcarrier spacing (Subcarrier spacing, SCS) of 15 kHz, an air interface error $\Delta 1$ can decrease to about 380 ns, and $2*\Delta 1$ can be less than 1 µs, thereby meeting a requirement for a time synchronization error of the 5G system and/or the TSN.

In another implementation, the parameter may include an SCS for transmitting an uplink data packet. Specifically, the access network device may allow sending a media access control (Media Access Control, MAC) control element (control element, CE) only on a resource whose SCS is not less than a specific subcarrier spacing, or set a maximum SCS of activated bandwidth parts (BandWidth Parts, BWPs) in a timing advance group (timing advance group, TAG) to be not less than the specific subcarrier spacing, so that the access network device can send the MAC CE on the resource with a high subcarrier spacing (subcarrier spacing, SCS). The specific subcarrier spacing may be predefined as a value greater than 15 kHz, for example, 30 kHz or 60 kHz. This is not limited in embodiments of this application.

The following uses examples to describe several manners in which the access network device obtains the indication information.

Manner 1: The access network device may receive the indication information from the core network node.

Specifically, the indication information may be included in any message/signaling sent by the core network node to the access network device, to indicate whether the terminal has the requirement for performing high-precision time synchronization.

For example, the access network device is the gNB, and the gNB is connected to the 5GC. The core network node may send the indication information to the gNB in any one of the following communication procedures initiated for the terminal.

(a) For example, in a terminal registration process, if an access and mobility management function (access and mobility management function, AMF) entity with which the terminal registers changes from a first AMF to a second AMF, the first AMF may carry the indication information in a message/signaling (such as an Namf_Communication-_UEContextTransfer response message) sent to the second AMF, or a policy control function (policy control function, PCF) entity may carry the indication information in a message/signaling (such as a UE Policy Association Establishment message) sent to the second AMF. Further, the second AMF may carry the indication information in a message/signaling (for example, an N2 interface message) sent to the gNB.

(b) In a process such as a service request process, an SMF carries the indication information in a message/signaling (such as an Nsmf_PDUSession_UpdataSMContextResponse message) sent to the AMF. Further, the AMF carries the indication information in a message/signaling (for example, an N2 request message) sent to the gNB. The SMF may obtain the indication information from the PCF or an application function (application function, AF), or the indication information may be prestored in the SMF.

(c) In a process such as a protocol data unit session (protocol data unit session, PDU session) establishment process or a PDU session modification process, the SMF carries the indication information in the message/signaling (such as an Nsmf_PDUSession_CreateSMContextResponse message or the Nsmf_PDUSession_UpdataSMContex-tResponse message) sent to the AMF. Further, AMF carries the indication information in the message/signaling (such as the N2 interface message or an N2 PDU session request message) sent to the gNB.

It should be noted that, when the core network node obtains, from another core network node, the indication information used to indicate whether the terminal has the requirement for performing high-precision time synchronization, the core network node may directly forward the indication information to the access network device, or parse the indication information and still send the indication information to the access network device (as shown in manners (a) to (c)); or the core network device may parse the indication information to obtain content in the indication information, form new indication information, and then send the new indication information to the access network device, where the content indicated by the new indication information remains the same, but an information form may change. This is not limited in this application.

Optionally, in another implementation, the core network node may implicitly indicate, to the gNB, whether the terminal has the requirement for performing high-precision time synchronization. For example, when an SMF establishes or configures an uplink QoS flow for the UE, the SMF indicates that the uplink QoS flow is used to transmit the uplink time synchronization message, and/or indicates that data transmitted through the uplink QoS flow needs to be forwarded to another UE through local switching performed via the UPF. Alternatively, when an SMF establishes a downlink QoS flow for the UE, the SMF indicates that the downlink QoS flow is used by the UPF to forward the uplink time synchronization message to the terminal, and/or indicates that data transmitted on the downlink QoS flow is uplink data that is sent by another terminal and that is forwarded by the UPF through local switching. The SMF may indicate information related to the uplink/downlink QoS flow to the gNB in the manner (b) or (c) in the foregoing implementation. For another example, an SMF configures a specific QoS flow identifier (QoS flow identifier, QFI) or a 5QI for a QoS flow. Alternatively, an SMF configures a specific QoS parameter for a QoS flow, for example, configures any one or more of parameters such as a specific priority, a specific packet delay budget (Packet Delay Budget, PDB), and a specific packet error rate (Packet Error Rate, PER). The 5QI is a QoS parameter, and a value of the 5QI may range from 0 to 255. Different values of the 5QI may have corresponding QoS feature sets. For example, when 5QI=1, the value corresponds to specific values or value ranges of QoS features such as a resource type, a priority, and a PDB of a QoS flow. A value of the QFI may be the same as the value of the 5QI or have a correspondence with the value of the 5QI. The foregoing QoS flows may implicitly reflect that the UE needs to perform high-precision time synchronization or the UE is used in an uplink time synchronization scenario.

Manner 2: The access network device may receive the indication information from another access network device.

For example, the access network device is a target base station to which the terminal is handed over, and the access network device obtains the indication information from the source base station from which the terminal is handed over.

Specifically, when the terminal is handed over, the source base station may carry the indication information in a handover request (handover request) message. Alternatively, the source base station may implicitly indicate, to the target base station in another manner, whether the terminal requires high-precision time synchronization. For example, the source base station indicates, to the target base station, that the terminal has a QoS flow used to transmit the uplink time synchronization message, or a QoS flow used by the UPF to forward the uplink time synchronization message to the terminal, or that the terminal has a QoS flow for which a specific QFI or 5QI is configured, or a QoS flow for which a specific QoS parameter is configured. Details are not described.

Manner 3: The access network device may receive the indication information from the terminal.

The terminal may report the precision requirement for time synchronization between the terminal and the wireless network to the access network device, or report whether the terminal is used in an uplink time synchronization scenario, so that the access network device determines whether the terminal needs to perform high-precision time synchronization. A reporting manner may be explicit. For example, the indication information is included in a message sent to the access network device. Alternatively, a reporting manner may be implicit. This is not limited in this application.

For example, the terminal may complete the foregoing reporting process to the access network device in a random access process. Specifically, the access network device may group random access resources. A first group of random access resources is used by a terminal having the requirement for performing high-precision time synchronization, to perform random access, and a second group of random access resources is used by another terminal to perform random access. The random access resource includes a random access time-frequency resource and/or a random access preamble. The terminal may initiate random access by using the first group of random access resources, or the terminal may carry the indication information in the message sent to the access network device. For example, an msgA message or an msg3 message carries one MAC CE as the indication information. The MAC CE may include only a MAC subheader, and does not include additional payload content. The msgA represents the first message in a two-step random access process, and the msg3 represents the third message in a four-step random access process.

For another example, after accessing the access network device, the terminal may indicate, to the base station, whether the terminal has the requirement for performing high-precision time synchronization, by using any one of RRC signaling, or another control signaling such as uplink control information (uplink control information, UCI), a radio link control (radio link control, RLC) control PDU (control PDU), a packet data convergence protocol (packet data convergence protocol, PDCP) control PDU, a service data adaptation layer protocol (service data adaptation protocol, SDAP) control PDU, or the MAC CE. In addition, the core network node may indicate, by using non-access stratum (non-access stratum, NAS) signaling, that the terminal requires for performing high-precision time synchronization, or that the terminal is preconfigured to be used in the uplink time synchronization scenario. In this way, the terminal indicates the information to the access network device.

Optionally, in an implementation of this application, a sum of a PDB of an uplink QoS flow and a PDB of a downlink QoS flow is less than a preset value, where the uplink QoS flow is used to send the uplink time synchronization message, and the downlink QoS flow is used to forward the uplink time synchronization message.

Optionally, the PDB of the uplink QoS flow includes any combination of duration in which the uplink time synchronization message stays in a translator of the first terminal, duration in which the uplink time synchronization message stays in the first terminal, duration in which the uplink time synchronization message is transmitted from the first terminal to the UPF, and duration in which the UPF performs uplink processing on the uplink time synchronization message.

Optionally, the PDB of the downlink QoS flow includes any combination of duration in which the uplink time synchronization message stays in a translator of a second terminal, duration in which the uplink time synchronization message stays in the second terminal, duration in which the uplink time synchronization message is transmitted from the second terminal to the UPF, and duration in which the UPF performs downlink processing on the uplink time synchronization message.

In this implementation, the first terminal is a transmit end of the uplink time synchronization message, and the second terminal is a receive end of the uplink time synchronization message.

Optionally, in an implementation of this application, when the access network device uses a CU-DU architecture, a CU of the access network device may receive the indication information and indicate content of the indication information to a DU, and the DU of the access network device generates the TAC and sends the TAC to the terminal.

Specifically, the CU of the access network device receives the indication information from the core network node, the another access network device, or the first terminal. The indication information indicates whether the terminal has the requirement for performing high-precision time synchronization. Further, the CU sends second indication information to the terminal. Content indicated by the second indication information is the same as the content indicated by the foregoing indication information, but a form of the second indication information may be the same as or may be different from that of the foregoing indication information. This is not limited in this application. Optionally, the CU may alternatively forward the indication information to the DU.

In an implementation, the CU may add an indication field ULSyncIndication to an F TAP message sent to the DU, for example, a UE context setup request (UE context setup request) message in a UE context setup (UE context setup) process, a UE context modification request (UE context modification request) message in a UE context modification (UE context modification) process, or a UE context modification confirm (UE context modification confirm) message in a UE context modification required (UE context modification required) process. The field is an optional field. In an implementation, when there is the field, it indicates that the CU indicates, to the DU, that the terminal has the requirement for performing high-precision time synchronization, or that the terminal needs to perform high-precision time synchronization/the terminal is used in the uplink time synchronization scenario. When there is not the field, it indicates that the terminal does not have the requirement for performing high-precision time synchronization, or that the terminal does not need to perform high-precision time synchronization/the terminal is not used in the uplink time synchronization scenario. In another implementation, different values of the field are used to indicate different cases. For example, the value 1 indicates that the terminal has the requirement for performing high-precision time synchronization; the value 0 indicates that the terminal does not have the requirement for performing high-precision time synchronization.

Optionally, in another implementation of this application, a DU of the access network device may alternatively receive the indication information, and indicates content of the indication information to a CU.

Specifically, the DU of the access network device receives the indication information sent by the terminal via the MAC CE, UCI, or a random access process message. Subsequently, the DU may indicate the content of the indication information to the CU, in other words, indicate, to the CU, whether the terminal has the requirement for performing high-precision time synchronization. Therefore, when the terminal is handed over, the CU may indicate, to a target access network device, whether the terminal needs to perform high-precision time synchronization. The DU may add an indication field ULSyncIndication to an F1AP message sent to the CU, for example, a UE context setup response (UE context setup response) message in a UE context setup process, a UE context modification response (UE context modification response) message in a UE context modification process, or a UE context modification required (UE context modification required) message in a UE context modification required process; or the DU may add the indication field ULSyncIndication to an assistance information data (ASSISTANCE INFORMATION DATA) frame in a transfer of assistance information (Transfer of Assistance Information) process (where as shown in Table 1, 1 bit of reserved bits is used as ULSyncIndication). The field is an optional field. In a manner, when there is the field, it indicates that the CU indicates, to the DU, that the UE has the requirement for performing high-precision time synchronization; or when there is not the field, it indicates that the terminal does not have the requirement for performing high-precision time synchronization. In another manner, different values of the field are used to indicate different cases. Refer to the foregoing descriptions, and details are not described again.

It may be understood that, the indication field ULSyncIndication is merely an example. A bit length occupied by the field and a location of the field in a message is not limited in this application. The indication field may alternatively be named in another manner. This is not limited in this application.

air interface synchronization error, so that synchronization between TSN devices is improved, and TSN performance is improved.

FIG. 5 is a schematic flowchart of a time synchronization method according to an embodiment of this application. The method includes the following steps.

S501: An access network device determines a parameter used for time synchronization between a terminal and a wireless network.

Optionally, the parameter may include an adjustment step of a TA and/or a subcarrier spacing. Specifically, the access network device may reduce the adjustment step of the TA of the terminal and/or increase the subcarrier spacing. For details, refer to related content in the embodiment shown in FIG. 4. Details are not described again.

Optionally, the parameter may include a length of a TAC. Because the adjustment step of the TA corresponds to the length of the TAC, a change of the adjustment step of the TA may cause a change of the length of the TAC field. A value of the TA of the terminal is obtained through calculation based on the adjustment step of the TA and the actual length of the TAC field sent by the access network device. For example, the length of the TAC field in a RAR message may be set to 13 bits, or the length of the TAC field in a TAC MAC CE may be set to 7 bits. The adjustment step of the TA is equal to a value (about 65.1 ns) that is of the adjustment step of the TA and that corresponds to an SCS of 120 kHz.

S502: The access network device notifies the terminal of the determined parameter.

Optionally, the parameter such as the length of the TAC and/or the adjustment step of the TA that is determined by the access network device may be indicated to the terminal by using any one of a system information, RRC signaling, or another control signaling.

TABLE 1

| Example of a format of an F1-U interface message | | | | | | | | |
|---|---|---|---|---|---|---|---|---|
| Bits (bits) | | | | | | | | quantity |
| 7 | 6 | 5 | 4 | 3 | 2 | 1 | 0 | of Bytes |
| PDU Type (=2) | | | | PDCP Duplication Indication | Assistance Information Indication | Reserved | | 1 |
| Reserved | | | | | ULSyncIndication | PDCP Duplication Activation Suggestion | | 1 |
| Quantity of Assistance Information Fields | | | | | | | | 0 or 1 |
| Assistance Information Type | | | | | | | | 0 or (Sum of |
| Number of Bytes for Radio Quality Assistance Information Fields | | | | | | | | 2* Quantity of |
| Radio quality assistance information | | | | | | | | Assistance Information Fields + Quantity of Bytes for Radio Quality Assistance Information Fields) |
| PDCP SN/NR-U SN | | | | | | | | 0/3 |

According to the time synchronization method provided in embodiments of this application, an access network device obtains information about whether a terminal requires high-precision time synchronization or whether the terminal is used in an uplink time synchronization scenario, and then performs a time synchronization operation on the terminal. This can avoid a case in which a requirement on a synchronization error of a TSN in the uplink time synchronization scenario cannot be met due to an excessively large In another implementation, the foregoing parameter may also be prestored in the terminal and invoked by the terminal when being used.

When the parameter includes the adjustment step of the TA, the method further includes S503: The access network device indicates a manner in which the terminal determines the value of the TA.

It may be understood that, S503 may be an alternative to S502, or S502 and S503 may be performed. This is not particularly limited in this application.

Optionally, the access network device sends indication information to the terminal, where the indication information is used to indicate a manner of determining the value of the TA to the terminal, or indicate which TA parsing manner to be used by the terminal. The terminal is notified that the access network device has adjusted the TA, so that a problem that the terminal parses the value of the TA in an incorrect manner can be avoided.

Optionally, the indication information is used to indicate the terminal to determine the value of the TA based on the adjustment step of the TA and/or an adjusted length of a TAC that are/is indicated by the access network device or based on a predefined adjustment step of the TA and/or a predefined adjusted length of the TAC. Alternatively, the indication information is used to indicate the terminal whether to determine the value of the TA based on the adjustment step of the TA and/or an adjusted length of a TAC that are/is indicated by the access network device or based on a predefined adjustment step of the TA and/or a predefined adjusted length of the TAC. Alternatively, the indication information is used to indicate a scale factor, where the scale factor is used to determine the value of the TA. The adjustment step of the TA and/or the adjusted length of the TAC that are/is indicated by the access network device may be determined by the access network device and indicated to the terminal in the manner of S501. The predefined adjustment step of the TA and/or the predefined adjusted length of the TAC may be predefined in the terminal.

The indication information may be a field, and is carried in the message/signaling sent by the access network device to the terminal.

Optionally, the access network device may send the indication information in any one of the following manners.

Manner 1: A PDCCH order (order) is used.

Specifically, after the terminal accesses the access network device, the access network device may trigger, by using the PDCCH order, the terminal to perform random access. Therefore, a field in the PDCCH order may be used as the indication information (referred to as a TA_step field below), to indicate which TA parsing manner to be used by the UE. The TA_step field may be a newly added field, or an existing field in the PDCCH order may be reused. This is not particularly limited in this application.

The following uses examples to describe several implementations for the indication information when the TA_step field is used.

(a) When the PDCCH order does not carry the TA_step field, the terminal may determine the value of the TA in a common manner. When the PDCCH order carries the TA_step field, the terminal determines the value of the TA by using a new length of the TAC field and/or a new adjustment step of the TA.

(b) Different values of the TA_step field indicate different TA parsing manners. It is assumed that the TA_step field is 1 bit in length. When a value of the TA_step field is "1", it indicates that the UE determines the value of the TA in a common manner; and when a value of the TA_step field is "0", it indicates that the UE determines the value of the TA by using a new length of the TAC field and/or a new adjustment step of the TA; and vice versa. This is not limited.

(c) The TA_step field indicates a scale factor (represented by u). When the PDCCH order does not carry the TA_step field or the indicated u is a specific value (for example, the indicated u=0), the terminal determines the value of the TA in a common manner. When the PDCCH order carries a TA_step field indicating u that is greater than 0, the terminal may determine an actual adjustment step of the TA by using a pre-specified length of the TAC field and/or a pre-specified adjustment step of the TA and the scale factor, and then obtain the value of the TA through calculation. For example, if the pre-specified adjustment step of the TA=step, the actual adjustment step of the TA may be step*u, step/u, step/$2^u$, or the like.

Optionally, in another implementation, the indication information may alternatively be in different PDCCH order formats, for example, different downlink control information formats (downlink control information formats, DCI formats). For example, if the PDCCH order is in a format 1, it indicates that the terminal determines the value of the TA in a common manner; if the PDCCH order is in a format 2, it indicates that the terminal determines the value of the TA by using a new length of the TAC field and/or a new adjustment step of the TA.

The foregoing common manner may mean that a value of a TA is determined based on a length of a TAC field and/or an adjustment step of a TA specified in a convention technology such as the 3rd Generation Partnership Project (the 3rd Generation Partnership Project, 3GPP) protocol. A new length of a TAC field and/or anew adjustment step of a TA may be determined by the access network device in step S501.

Manner 2: A handover command is used.

Specifically, in a handover process, a target access network device indicates, based on indication information in a handover command (handover command, HO command) sent to the terminal, which TA parsing manner to be used by the UE. For example, an indication field TA_step may be added to the HO command. For an implementation of the indication information, refer to the manner (a)/(b)/(c) described in Manner 1. Details are not described again.

It should be noted that, to avoid a case in which a requirement for TSN synchronization cannot be met because the target access network device to which the terminal is handed over does not support high-precision time synchronization, when exchanging information through an interface (for example, an X2 or Xn interface) between base stations, a source access network device and the target access network device may exchange information about whether the source access network device and the target access network device support high-precision time synchronization. When handing over a terminal that needs to perform high-precision synchronization, the source access network device sends a handover request message only to a target access network device that supports high-precision time synchronization.

Manner 3: A RAR message is used.

Specifically, in a random access process of the terminal, the access network device may indicate, based on indication information, which TA parsing manner to be used by the terminal. For example, the access network device may add an indication field TA_step to the RAR message. For an implementation of the indication information, refer to the manner (a)/(b)/(c) described in Manner 1. Details are not described again.

FIG. 5-1 is a schematic diagram of a format of a RAR message according to an embodiment of this application. The TA_step field is introduced to indicate which TA parsing manner to be used by the terminal. FIG. 5-2 is a schematic diagram of a format of another RAR message according to an embodiment of this application. The TA_step field may be used to indicate whether there is a Scaling factor field.

The Scaling factor field is used to indicate a value of the scaling factor u. The length of the TAC field still maintains 12 bits. FIG. 5-3 is a schematic diagram of a format of another RAR message according to an embodiment of this application. The TA_step field may be used to indicate whether there is a Scaling factor field. The 2-bit Scaling factor field is used to indicate a value of the scaling factor. The length of the TAC field is 10 bits.

Manner 4: A system information is used.

Specifically, the access network device may add an indication field TA_step to the system information, and broadcast the system information to one or more terminals in a cell of the access network device, to indicate which TA parsing manner to be used by one or more terminals. The system information may be a master information block (master information block, MIB) or a system information block 1 (system information block 1, SIB1). For an implementation of the indication information, refer to the manner (a)/(b)/(c) described in Manner 1. Details are not described again.

Manner 5: Unicast control signaling is used.

Specifically, the access network device may indicate, by using any one of the unicast control signaling, for example, radio resource control (radio resource control, RRC) signaling, a MAC CE, or another protocol layer control signaling, which manner used by the terminal to parse the TAC field and determine the value of the TA when the terminal performs random access (for example, in a random access process with collision avoidance). For example, an indication field TA_step may be carried in the unicast control signaling. For an implementation of the indication information, refer to the manner (a)/(b)/(c) described in Manner 1. Details are not described again. For another example, dedicated control signaling may be newly created to carry the indication information.

It may be understood that, in the embodiment shown in FIG. 5, whether the access network device receives indication information indicating that the terminal has a requirement for performing high-precision time synchronization (for example, the indication information in the embodiment shown in FIG. 4) before adjusting a TA-related parameter is not limited. Therefore, the embodiment shown in FIG. 5 may be independently performed. Alternatively, the access network device may determine the parameter such as the adjustment step of the TA for the terminal after receiving indication information such as the indication information in the embodiment shown in FIG. 4, and notify the terminal of the adjusted parameter or indicate a TA parsing manner to the terminal. That is, the embodiment shown in FIG. 5 and the embodiment shown in FIG. 4 may be combined for implementation. For example, S501 and S502 or S501 to S503 may be performed after S401 and S402.

According to the time synchronization method provided in embodiments of this application, the access network device indicates, to the terminal, the time synchronization parameter determined for the terminal, so as to assist in implementing high-precision time synchronization between the terminal and the wireless network. As an air interface synchronization error is further reduced, a requirement on a synchronization error of a TSN in an uplink time synchronization scenario may be met, and TSN performance may be improved.

FIG. 6 is a schematic flowchart of a time synchronization method according to an embodiment of this application. The method includes the following steps.

S601: A core network node determines a PDB of a PTP message on an uplink QoS flow and a PDB of the PTP message on a downlink QoS flow.

S602: The core network node determines that a sum of the PDB of the uplink QoS flow and the PDB of the downlink QoS flow is less than a preset value.

The PTP message includes an uplink time synchronization message. The uplink QoS flow may be used to send the uplink time synchronization message, and the downlink QoS flow may be used to forward the uplink time synchronization message.

The core network node may be an SMF.

Optionally, the PDB of the uplink QoS flow includes any combination of duration in which the PTP message stays in a DS-TT of a terminal (referred to as UE 1 below) that sends the uplink time synchronization message, duration in which the PTP message stays in UE 1, duration in which the PTP message is transmitted from UE 1 to a UPF, and duration in which the UPF performs uplink processing on the PTP message.

Optionally, the PDB of the downlink QoS flow includes any combination of duration in which the UPF performs downlink processing on the PTP message, duration in which the PTP message is transmitted from the UPF to a terminal (referred to as UE 2 below) that receives the uplink time synchronization message, duration in which the PTP message stays in UE 2, and duration in which the PTP message stays in a DS-TT of UE 2.

UE 1 receives the uplink time synchronization message generated by a TSN grandmaster clock. Further, UE 1 forwards the uplink time synchronization message to UE 2 over a wireless network. Then, UE 2 sends the uplink time synchronization message to a TSN device connected to UE 2, for example, a TSN slave.

In a possible implementation, UE 1 and UE 2 are connected to a same UPF. This embodiment of this application provides a definition of a PDB. Specifically, the PDB of the uplink QoS flow includes the duration in which the PTP message stays in UE 1, the duration in which the PTP message is transmitted from UE 1 to the UPF, and the duration in which the UPF performs uplink processing on the PTP message; the PDB of the downlink QoS flow includes the duration in which the UPF performs downlink processing on the PTP message, the duration in which the PTP message is transmitted from the UPF to UE 2, and the duration in which the PTP message stays in UE 2. In this implementation, the core network node determines that a sum of the duration in which the PTP message stays in the DS-TT of UE 1, the PDB of the uplink QoS flow, the PDB of the downlink QoS flow, and the duration in which the PTP message stays in the DS-TT of UE 2 is less than or equal to the preset value (referred to as Rth below). The preset value indicates a requirement on an upper limit of stay duration in which the PTP message passes through a transparent clock or a time-aware system (system aware system). In this embodiment of this application, the 5G system can function as the transparent clock of the TSN.

In a possible implementation, a UPF 1 connected to UE 1 and a UPF 2 connected to UE 2 are not a same UPF. After the uplink time synchronization message from UE 1 is sent to the UPF 1, the UPF 1 needs to forward the uplink time synchronization message to the UPF 2, and then the UPF 2 sends the uplink time synchronization message to UE 2. In this case, the core network node determines that a sum of the duration in which the uplink time synchronization message stays in the DS-TT of UE 1, the PDB of the uplink QoS flow, duration in which the uplink time synchronization message is forwarded to the UPF 2 from the UPF 1, the PDB of the downlink QoS flow, and the duration in which the uplink time synchronization message stays in the DS-TT of UE 2 is less than or equal to the preset value.

An example in which the foregoing PDB defined when UE 1 and UE 2 are connected to the same UPF is used and the core network node is an SMF is used to describe the time synchronization method provided in embodiments of this application.

In a possible implementation, step S601 includes the following steps.

S601-1: When the SMF configures, for UE 1, the uplink QoS flow (referred to as a QoS flow 1 below) used to transmit the PTP message, the SMF sets a value of the PDB of the QoS flow 1 to X1.

The PTP message includes the uplink time synchronization message sent by UE 1.

S601-2: When the SMF configures, for UE 2, the downlink QoS flow (referred to as a QoS flow 2 below) used to transmit the PTP message, the SMF determines a value of the PDB of the QoS flow 2 based on usage of the QoS flow 2.

Optionally, when the QoS flow 2 is used to transmit a downlink time synchronization message received by the UPF from an external TSN grandmaster clock via an NW-TT, that is, in a downlink time synchronization scenario, the SMF may set the value of the PDB of the QoS flow 2 to X2. The PDB of the QoS flow 2 includes duration in which the PTP message stays in the NW-TT and duration in which the PTP message stays in the UPF. In an implementation, the SMF may indicate, in an N4 session establishment message or an N4 session modification message sent to the UPF, that the QoS flow 2 is used to transmit the downlink time synchronization message received by the UPF from the external TSN grandmaster clock. Further, the SMF may indicate, to a gNB and/or the UE, that the QoS flow 2 is used to transmit a downlink time synchronization message received by the UPF from an external TSN network.

Correspondingly, step S602 includes: The SMF determines that X2+UE-DS-TT stay duration≤Rth, where the UE-DS-TT stay duration indicates stay duration of the PTP message in a DS-TT of a terminal. The terminal may be UE 1 or UE 2. This is not limited.

Optionally, when the QoS flow 2 is used to transmit the uplink time synchronization message received by the UPF through the uplink QoS flow (for example, the QoS flow 1), that is, in an uplink time synchronization scenario, the SMF may set the value of the PDB of the QoS flow 2 to X3. In addition, the SMF may separately indicate, to one or more of the UPF, a gNB, or the UE, that the QoS flow 2 is used to transmit the uplink time synchronization message received by the UPF through the uplink QoS flow. Details are not described.

Correspondingly, step S602 includes: The SMF determines that X1+X3+UE 1-DS-TT stay duration+UE 2-DS-TT stay duration≤Rth. The UE 1-DS-TT stay duration indicates stay duration in which the PTP message stays in the DS-TT of UE 1, and the UE 2-DS-TT stay duration indicates stay duration in which the PTP message stays in the DS-TT of UE 2.

In another implementation, if the UPF 1 connected to UE 1 and the UPF 2 connected to UE 2 are not the same UPF, step S602 may include: The SMF determines that X1+X3+UE 1-DS-TT stay duration+UE 2-DS-TT stay duration+forward delay between the UPF 1 and the UPF 2≤Rth.

Optionally, the duration in which the PTP message stays in the DS-TT of the UE is very short, and may be ignored in an actual application. Therefore, the SMF may set X1+X3 to be equal to X2, and set X1 and X3 based on a specific proportion. For example, X1 and X3 are respectively set to half of X2, or X1 is set to (⅔)*X2, and X3 is set to (⅓)*X2. The SMF may alternatively set X1 and X3 according to another rule. This is not limited in this application.

In another implementation, the duration in which the PTP message stays in the DS-TT of the UE (including the UE 1-DS-TT stay duration and the UE 2-DS-TT stay duration) may also be considered. For example, the SMF may set X1+X3+UE 1-DS-TT stay duration+UE 2-DS-TT stay duration to be equal to X2+UE 1-DS-TT, and then set X1 and X3 based on a specific proportion, where values of the UE 1-DS-TT stay duration and the UE 2-DS-TT stay duration may be considered to be the same.

In another possible implementation, step S601 includes the following steps.

S601-A: When the SMF configures, for UE 1, the uplink QoS flow (QoS flow 1) used to transmit the PDP message, the SMF determines whether the PDP message needs to be forwarded to another UE via the UPF, so as to perform time synchronization on a TSN device connected to the another UE; and if the PDP message needs to be forwarded to another UE via the UPF, the SMF sets the PDB of the QoS flow 1 to X1, or if the PDP message does not need to be forwarded to another UE via the UPF, the SMF sets the PDB of the QoS flow 1 to X4.

The PDP message includes the uplink time synchronization message sent by UE 1.

S601-B: When the SMF configures, for UE 2, the downlink QoS flow (referred to as a QoS flow 2 below) used to transmit the PDP message, the SMF determines a value of the PDB of the QoS flow 2 based on usage of the QoS flow 2.

Optionally, when the QoS flow 2 is used to transmit a downlink time synchronization message received by the UPF from an external TSN grandmaster clock via an NW-TT, the SMF sets the value of the PDB of the QoS flow 2 to X2. In addition, the SMF may separately indicate, to one or more of the UPF, a gNB, or the UE, that the QoS flow 2 is used to transmit a PTP time synchronization message received by the UPF from an external network TSN. Details are not described.

Correspondingly, step S602 includes: The SMF determines that X2+UE-DS-TT stay duration≤Rth.

Optionally, when the QoS flow 2 is used to transmit the uplink time synchronization message received by the UPF through the QoS flow 1, the SMF sets the value of the PDB of the QoS flow 2 to X3. In addition, the SMF may separately indicate, to one or more of the UPF, a gNB, or the UE, that the QoS flow 2 is used to transmit the uplink time synchronization message received by the UPF through the uplink QoS flow. Details are not described.

Correspondingly, step S602 includes: The SMF determines that X4+UE-DS-TT stay duration+UPF stay duration≤Rth, and X1+X3+UE 1-DS-TT stay duration+UE 2-DS-TT stay duration≤Rth. Similarly, in the foregoing case, it is considered that the UPF connected to UE 1 and the UPF connected to UE 2 are the same UPF. If the UPF 1 connected to UE 1 and the UPF 2 connected to the UE are not the same UPF, a forward delay between UPFs further needs to be considered when the PDBs of the QoS flows are set. The SMF determines that X1+X3+UE 1-DS-TT stay duration+UE 2-DS-TT stay duration+forward delay between the UPF 1 and the UPF 2≤Rth.

For meanings of the UE-DS-TT stay duration, the UE 1-DS-TT stay duration, and the UE 2-DS-TT stay duration, refer to the foregoing related content. Details are not described again.

For setting rules of X1 and X3, refer to the foregoing related content. Details are not described again.

Optionally, in an implementation, to determine whether to configure the QoS flow 1 for UE 1 and whether to configure the QoS flow 2 for UE 2, the SMF may determine, based on information obtained from another core network node, whether UE 1 needs to send the uplink time synchronization message, or whether the uplink time synchronization message needs to be forwarded to another UE via the UPF. For example, a PCF or an AF may indicate, to the SMF, that a grandmaster clock of a TSN working domain is deployed on a TSN node of UE 1. In this case, the SMF may determine that UE 1 needs to send the uplink time synchronization message, and configure, for UE 1, the QoS flow 1 used to transmit the uplink time synchronization message. Further, the PCF or the AF may indicate, to the SMF, that a TSN device connected to UE 1 and a TSN device connected to UE 2 belong to a same TSN working domain. In this case, the SMF may configure, for UE 2, the downlink QoS flow 2 used to forward the uplink time synchronization message.

Optionally, in the uplink time synchronization scenario, after receiving the uplink time synchronization message from the QoS flow 1, the UPF may perform processing in one of the following manners.

Manner 1: The UPF forwards the uplink PTP message to a PDU session other than a PDU session that receives the uplink time synchronization message.

Manner 2: The UPF forwards the uplink PTP message to another PDU session whose NW-TT side has a same Ethernet port (port) number as that of an NW-TT side associated with the PDU session of UE 1 or another PDU session that belongs to a same TSN domain as the PDU session of UE 1, and the another PDU session does not include the PDU session that receives the uplink time synchronization message.

Manner 3: The UPF forwards the uplink time synchronization message to all PDU sessions; or the UPF forwards the uplink time synchronization message in Manner 2, but the PDU session that receives the uplink time synchronization message is included. When a terminal or a TSN slave that serves as a grandmaster clock receives an uplink time synchronization message of a same TSN domain, the terminal or the TSN slave ignores the uplink time synchronization message.

It may be understood that the time synchronization method provided in the embodiment shown in FIG. 6 may be performed in combination with either or both of the time synchronization methods provided in the embodiment shown in FIG. 4 or FIG. 5, and no special limitation is imposed on an execution sequence. For example, when the embodiment shown in FIG. 6 and the embodiment shown in FIG. 4 are performed in combination, steps S601 and S602 may be performed before or after steps S401 and S402, or may be performed simultaneously.

According to the time synchronization method provided in embodiments of this application, it can be ensured that duration in which the uplink time synchronization message stays in the 5G system meets a requirement on stay duration of a transparent clock specified in the PTP protocol, so that an extra error caused by excessively long stay duration of the uplink time synchronization message in the 5G system is avoided.

The foregoing describes in detail examples of the time synchronization method provided in this application.

It can be understood that, to implement the foregoing functions, a communication apparatus includes corresponding hardware structures and/or software modules for performing the functions. A person skilled in the art should be easily aware that, in combination with the examples of units and algorithm steps described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the communication apparatus may be divided into functional units based on the foregoing method examples. For example, each functional unit may be obtained through division based on each function, or two or more functions may be integrated into one processing unit. The integrated unit may be implemented in a form of hardware, or may be implemented in a form of a software functional unit. It needs to be noted that, in this application, division into the units is an example, and is merely a logical function division. During actual implementation, another division manner may be used.

Figure 7:
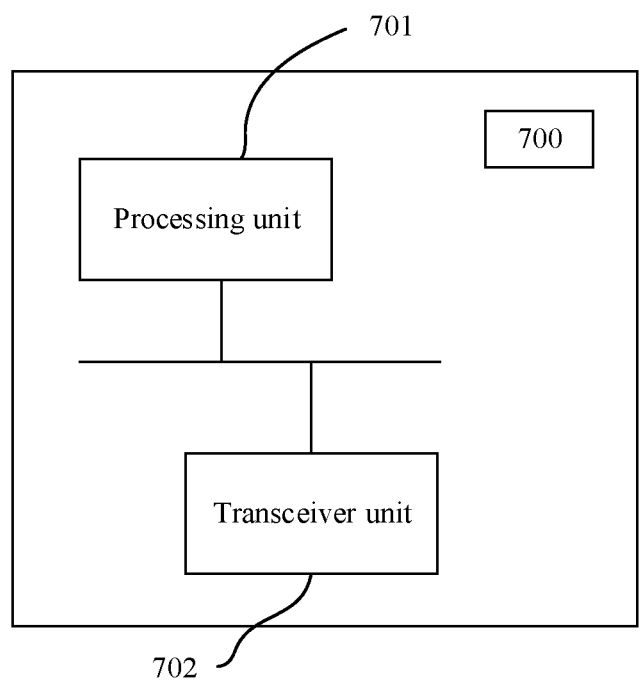
FIG. 7 is a schematic diagram of a structure of a communication apparatus 700 according to an embodiment of this application.

For example, a communication apparatus 700 shown in FIG. 7 includes a processing unit 701 and a transceiver unit 702.

In an implementation of this application, the communication apparatus 700 is configured to support an access network device in implementing a function of the access network device in the time synchronization method provided in embodiments of this application. For example, the transceiver unit 702 may be configured to obtain first indication information, where the first indication information is used to indicate that a first terminal has a requirement for receiving or sending an uplink time synchronization message, and/or the indication information is used to indicate a precision requirement for time synchronization between the first terminal and a wireless network. The processing unit 701 is configured to perform time synchronization on the first terminal based on the first indication information.

In this embodiment of this application, communication units that are in the communication apparatus and that are configured to exchange information with other network devices (including a terminal, another access network device, a core network device, and the like) are collectively referred to as the transceiver unit 702. It may be understood that, the transceiver unit 702 may include a plurality of transceiver units configured to communicate with different network devices. For example, the transceiver unit 702 includes a transceiver unit configured to communicate with the terminal, a transceiver unit configured to communicate with the another access network device, and a transceiver unit configured to communicate with the core network device. These transceiver units may be separately disposed, or may be integrated into one unit. This is not particularly limited in this application. For example, the transceiver unit communicating with the terminal may be implemented by using a transceiver and an antenna, and the transceiver unit communicating with the another access network device or the core network device may be implemented by using different communication interfaces.

In a possible implementation, the transceiver unit 702 may be configured to receive the first indication information from the core network node, or receive the first indication information from a second access network device, or receive the first indication information from the first terminal. For descriptions of the first indication information and detailed descriptions of various receiving manners, refer to other embodiments of this application, for example, related content in embodiments shown in FIG. 4 and FIG. 5. Details are not described again.

In a possible implementation, the processing unit 701 may be configured to determine a parameter used for time synchronization between the first terminal and the wireless network, where the parameter includes a TA and/or a subcarrier spacing. For detailed descriptions of determining the parameter, refer to the related content in another embodiment of this application, for example, the related content in embodiments shown in FIG. 4 and FIG. 5. Details are not described again.

In a possible implementation of the first aspect, when the parameter includes the TA, the transceiver unit 702 may further indicate a manner in which the first terminal determines a value of the TA.

Optionally, the transceiver unit 702 is specifically configured to send second indication information to the first terminal, where the second indication information is used to: indicate the first terminal to determine the value of the TA based on the adjustment step of the TA and/or an adjusted length of a TAC that are/is indicated by the access network device or based on a predefined adjustment step of the TA and/or a predefined adjusted length of the TAC; indicate the first terminal whether to determine the value of the TA based on the adjustment step of the TA and/or an adjusted length of a TAC that are/is indicated by the access network device or based on a predefined adjustment step of the TA and/or a predefined adjusted length of the TAC; or indicate a scale factor, where the scale factor is used to determine the value of the TA. For detailed descriptions of the second indication information, refer to the related content in another embodiment of this application, for example, the related content in embodiments shown in FIG. 4 and FIG. 5. Details are not described again.

In another implementation of this application, the communication apparatus 700 is configured to support the core network node such as an SMF in implementing a function of the core network node in the time synchronization method provided in embodiments of this application. For example, the processing unit 701 is configured to: determine a PDB of an uplink QoS flow of a PTP message and a PDB of a downlink QoS flow of the PTP message; and determine that a sum of the PDB of the uplink QoS flow and the PDB of the downlink QoS flow is less than a preset value. The PTP message includes an uplink time synchronization message. The uplink QoS flow is used to send the uplink time synchronization message, and the downlink QoS flow is used to forward the uplink time synchronization message.

For detailed descriptions of the PDB of the uplink QoS flow and the PDB of the downlink QoS flow, refer to another embodiment of this application, for example, the related content in the embodiment shown in FIG. 6. Details are not described again.

In a possible implementation, the processing unit 701 may determine different values of the PDB of the downlink QoS flow based on usage of the downlink QoS flow. Specifically, when the downlink QoS flow is used to transmit a downlink time synchronization message, the processing unit determines that the PDB of the downlink QoS flow includes duration in which the PTP message stays in a NW-TT and duration in which the PTP message stays in a UPF; when the downlink QoS flow is used to forward the uplink time synchronization message, the PDB of the downlink QoS flow includes duration in which the UPF performs downlink processing on the PTP message, duration in which the PTP message is transmitted from a UPF to UE 2, and duration in which the PTP message stays in UE 2.

In a possible implementation, the processing unit 701 may be configured to: determine whether the PDP message transmitted via the terminal needs to be forwarded to another terminal via the UPF, and set the PDB of the uplink QoS flow that is used to transmit the PDP message to different values based on determining results.

For a specific manner of how to set the value of the PDB of the uplink/downlink QoS flow and how the processing unit 701 determines, when the PDB of the uplink/downlink QoS flow is set to a different value, that the sum of the PDB of the uplink QoS flow and the PDB of the downlink QoS flow is less than the preset value, refer to another embodiment of this application, for example, detailed descriptions of steps S601 and S602 in the embodiment shown in FIG. 6. Details are not described again.

For detailed descriptions of operations performed by the functional units of the communication apparatus 700, refer to actions of the access network device or the core network device in embodiments of the time synchronization method provided in this application, for example, related content in embodiments shown in FIG. 4 to FIG. 6.

In another implementation of this application, in hardware implementation, a function of the processing unit 701 may be performed by one or more processors, and a function of the transceiver unit 702 may be performed by a transceiver (transmitter/receiver) and/or a communication interface. The processing unit 701 may be built in or independent of a processor of a base station or the core network device in a form of hardware, or may be stored in a memory of the base station or the core network device in a form of software, so that the processor invokes and performs an operation corresponding to each of the foregoing functional units.

Figure 8:
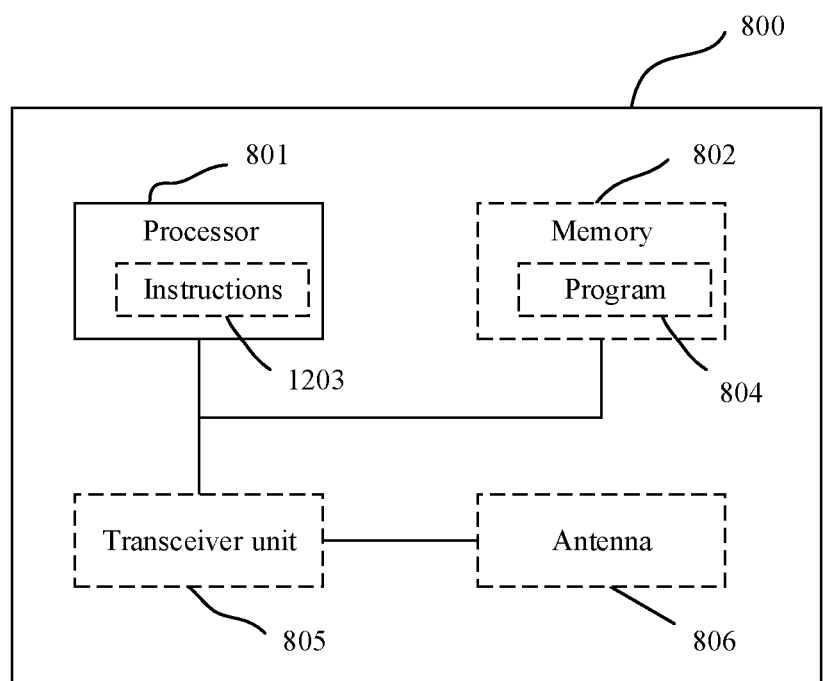
FIG. 8 is a schematic diagram of a structure of a communication apparatus 800 according to an embodiment of this application.

FIG. 8 is a schematic diagram of a structure of a communication apparatus 800 according to this application. The communication apparatus 800 may be configured to implement the time synchronization method described in the foregoing method embodiments. The communication apparatus 800 may be a chip, an access network device, a core network device, another wireless communication device, or the like.

The communication apparatus 800 includes one or more processors 801. The one or more processors 801 may support the communication apparatus 1000 in implementing the time synchronization method performed by the access network device in embodiments of this application, for example, the method performed by the access network device in embodiments shown in FIG. 4 to FIG. 6. Alternatively, the one or more processors 801 may support the communication apparatus 800 in implementing the method performed by a core network node in embodiments of this application, for example, the method performed by the core network node in embodiments shown in FIG. 4 to FIG. 6. Alternatively, the one or more processors 801 may support the communication apparatus 800 in implementing the method performed by a terminal in embodiments of this application, for example, the method performed by the first terminal or the second terminal in embodiments shown in FIG. 4 to FIG. 6.

The processor 801 may be a general-purpose processor or a dedicated processor. For example, the processor 801 may include a central processing unit (central processing unit, CPU) and/or a baseband processor. The baseband processor may be configured to process communication data (for example, the first message above), and the CPU may be configured to: implement corresponding control and processing functions, execute a software program, and process data of the software program.

Further, the communication apparatus 800 may further include a transceiver unit 805, configured to implement signal input (receiving) and output (sending).

For example, the communication apparatus 800 may be the chip, and the transceiver unit 805 may be an input and/or output circuit of the chip. Alternatively, the transceiver unit 805 may be an interface circuit of the chip, and the chip may be used as a component of a base station or another wireless communication device.

For another example, the communication apparatus 800 may be a base station. The transceiver unit 805 may include a transceiver or a radio frequency chip. The transceiver unit 805 may further include a communication interface.

Optionally, the communication apparatus 800 may further include an antenna 806 that may be configured to support the transceiver unit 805 in implementing receiving and sending functions of the communication apparatus 800.

Optionally, the communication apparatus 800 may include one or more memories 802. The memory 802 stores a program (or may be instructions or code) 803. The program 803 may be run by the processor 801, so that the processor 801 performs the method described in the foregoing method embodiments. Optionally, the memory 802 may further store data. Optionally, the processor 801 may further read data (for example, predefined information) stored in the memory 802. The data and the program 803 may be stored at a same storage address, or the data and the program 803 may be stored at different storage addresses.

The processor 801 and the memory 802 may be disposed separately, or may be integrated together, for example, integrated on a board or a system-on-a-chip (system-on-a-chip, SoC).

In a possible design, the communication apparatus 800 is the access network device or the chip that can be used in the access network device.

For detailed descriptions of operations performed by the communication apparatus 800 in the foregoing possible designs, refer to actions of the terminal, the access network device or the core network node in embodiments of the time synchronization method provided in this application, for example, related content in embodiments shown in FIG. 4 to FIG. 6. Details are not described again.

It should be understood that the steps in the foregoing method embodiments may be completed by using a logic circuit in a form of hardware or instructions in a form of software in the processor 801. The processor 801 may be a CPU, a digital signal processor (digital signal processor, DSP), an application-specific integrated circuit (application-specific integrated circuit, ASIC), a field programmable gate array (field programmable gate array, FPGA), or another programmable logic device, for example, a discrete gate, a transistor logic device, or a discrete hardware component.

This application further provides a computer program product. When the computer program product is executed by the processor 801, the time synchronization method in any one of the method embodiments of this application is implemented. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media.

The computer program product may be stored in the memory 802, for example, a program 804. After processes such as preprocessing, compilation, assembly, and connection are performed, the program 804 is finally converted into an executable target file that can be executed by the processor 801.

This application further provides a computer-readable storage medium that stores a computer program. When the computer program is executed by a computer, the time synchronization method in any one of the method embodiments of this application is implemented. The computer program may be a high-level language program, or may be an executable target program.

For example, the computer-readable storage medium may be the memory 802. The memory 802 may be a volatile memory or a non-volatile memory, or the memory 802 may include both a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

Figure 9:
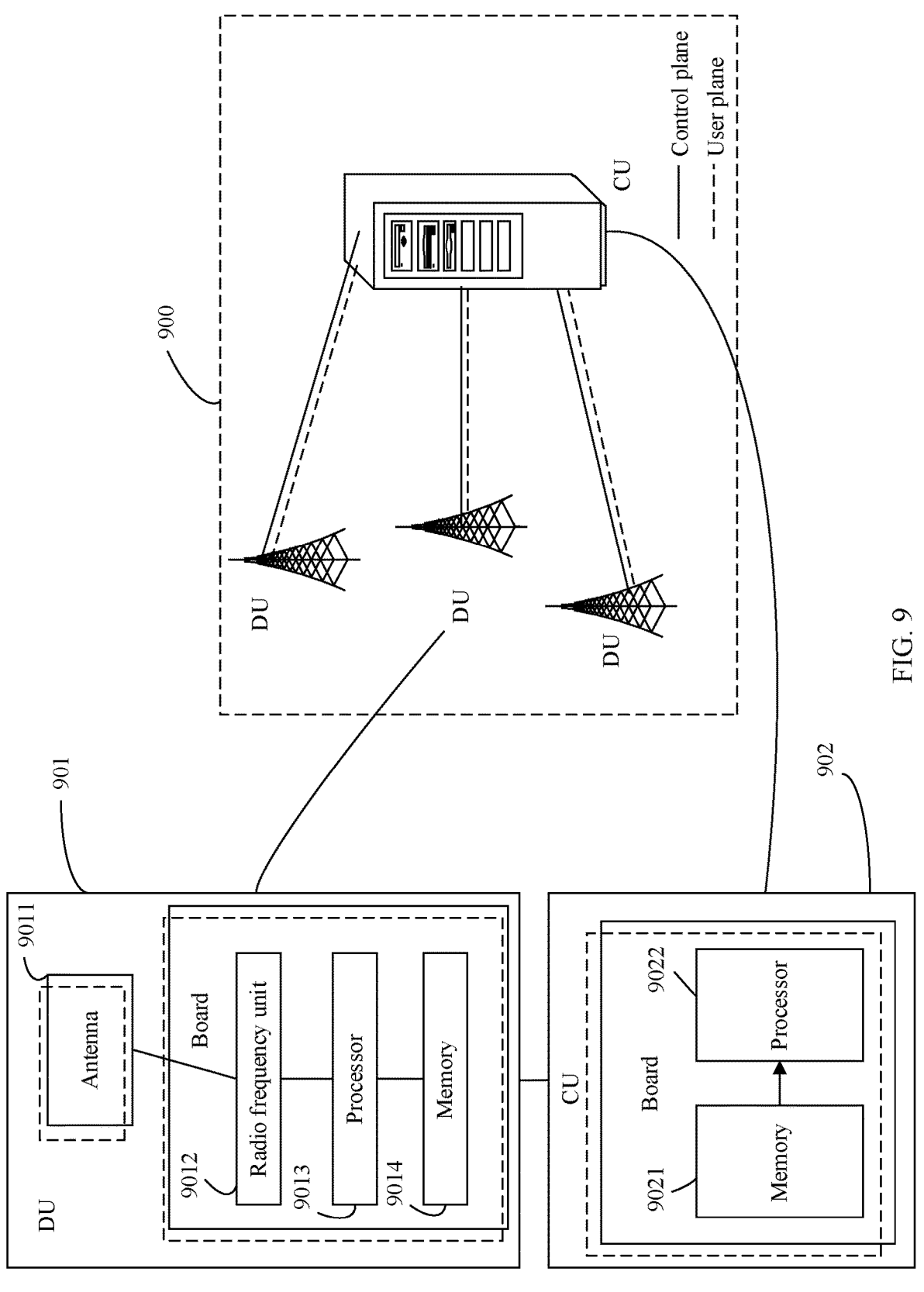
FIG. 9 is a schematic diagram of a structure of a base station 900 according to an embodiment of this application.

When the communication apparatus 800 is an access network device, FIG. 9 is a schematic diagram of a structure of a base station according to an embodiment of this application. As shown in FIG. 9, the base station may be used in the system shown in FIG. 2 and FIG. 3, to perform a function of the access network device in the foregoing method embodiments. The base station 900 may include one or more DUs 901 and one or more CUs 902. The DU 901 may include at least one antenna 9011, at least one radio frequency unit 9012, at least one processor 9013, and at least one memory 9014. The DU 901 is mainly configured to receive and send a radio frequency signal, convert a radio frequency signal and a baseband signal, and perform some baseband processing. The CU 902 may include at least one processor 9022 and at least one memory 9021. The CU 902 and the DU 901 may communicate with each other through an interface. A control plane (Control plane) interface may be an Fs-C, for example, F1-C, and a user plane (User Plane) interface may be an Fs-U, for example, F1-U.

The CU 902 is mainly configured to: perform baseband processing, control the base station, and the like. The DU 901 and the CU 902 may be physically disposed together, or may be physically separated, that is, the base station may be a distributed base station. The CU 902 is a control center of the base station, may also be referred to as a processing unit, and is mainly configured to implement a baseband processing function. For example, the CU 902 may be configured to control the base station to perform the operation procedure related to the network device in the foregoing method embodiments.

In addition, optionally, the base station 900 may include one or more radio frequency units (RUs), one or more DUs, and one or more CUs. The DU may include at least one processor 9013 and at least one memory 9014, the RU may include at least one antenna 9011 and at least one radio frequency unit 9012, and the CU may include at least one processor 9022 and at least one memory 9021.

In an instance, the CU 902 may include one or more boards. A plurality of boards may jointly support a radio access network (for example, a 5G network) of a single access standard, or may separately support radio access networks (for example, an LTE network, a 5G network, or another network) of different access standards. The memory 9021 and the processor 9022 may serve one or more boards. In other words, a memory and a processor may be separately disposed on each board. Alternatively, a plurality of boards may share a same memory and a same processor. In addition, a necessary circuit may be further disposed on each board. The DU 901 may include one or more boards. A plurality of boards may jointly support a radio access network (for example, a 5G network) of a single access standard, or may separately support radio access networks (for example, an LTE network, a 5G network, or another network) of different access standards. The memory 9014 and the processor 9013 may serve one or more boards. In other words, a memory and a processor may be separately disposed on each board. Alternatively, a plurality of boards may share a same memory and a same processor. In addition, a necessary circuit may be further disposed on each board.

The DU and the CU may jointly perform a function of the processing unit 701 in the communication apparatus 700 shown in FIG. 7 or a function of the processor 801 in the communication apparatus 800 shown in FIG. 8. The RU may perform a function of the transceiver unit 702 in the communication apparatus 700 shown in FIG. 7 or a function of the transceiver unit 805 in the communication apparatus 800 shown in FIG. 8. Details are not described again.

Figure 10:
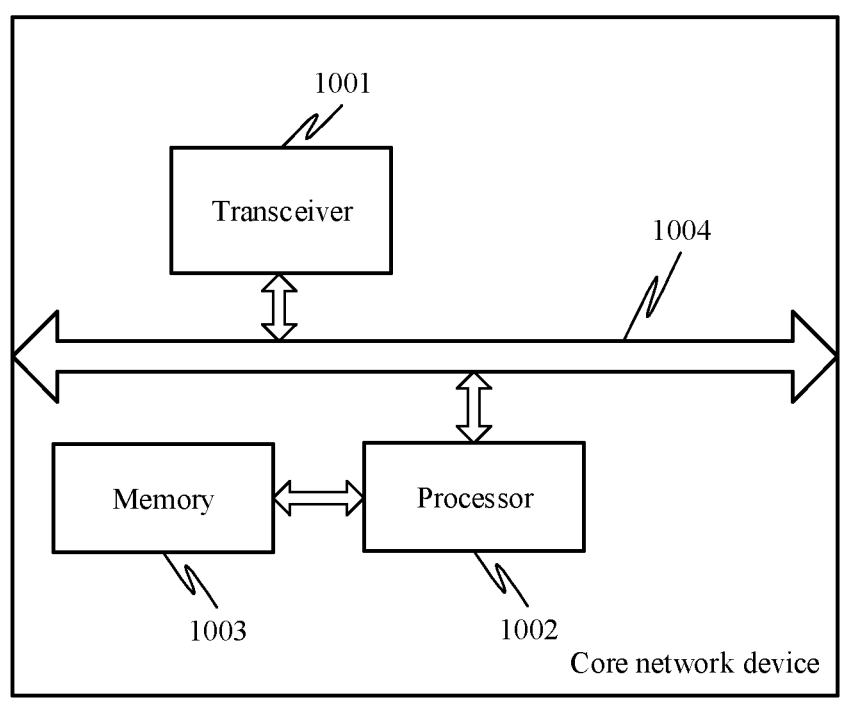
FIG. 10 is a schematic diagram of a structure of a core network node 1000 according to an embodiment of this application.

When the communication apparatus 800 is a core network node, FIG. 10 is a schematic diagram of a structure of the core network device according to an embodiment of this application. As shown in FIG. 10, the base station may be used in the system shown in FIG. 2 and FIG. 3, to perform a function of the core network node in the foregoing method embodiments.

As shown in FIG. 10, the core network device may include a transceiver 1001 and a processor 1002. The figure further shows a memory 1003 and a bus 1004. The transceiver 1001, the processor 1002, and the memory 1003 are connected and communicate with each other through the bus 1004.

The transceiver 1001 may be a communication interface. The communication interface may be directly or indirectly connected to a corresponding communication interface of the access network device, and is configured to exchange information between the access network and a core network.

The processor 1002 may be configured to perform the processing processes related to the core network device in the method embodiments shown in FIG. 4 to FIG. 6 and/or another process of the technology described in this application.

The memory 1003 is configured to store executable program code or data, where the program code includes computer operation instructions. The program code stored in the memory 1003 may be executed by the processor 1002.

For descriptions of the method procedure performed by the core network device in this embodiment and specific functions of the apparatuses or components in the device, refer to the related content in another embodiment of this application. Details are not described herein again.

A specific type of the core network device is not particularly limited in embodiments of this application. The core network device may be an SMF, another core network device, or a combination of a plurality of core network nodes.

Figure 11:
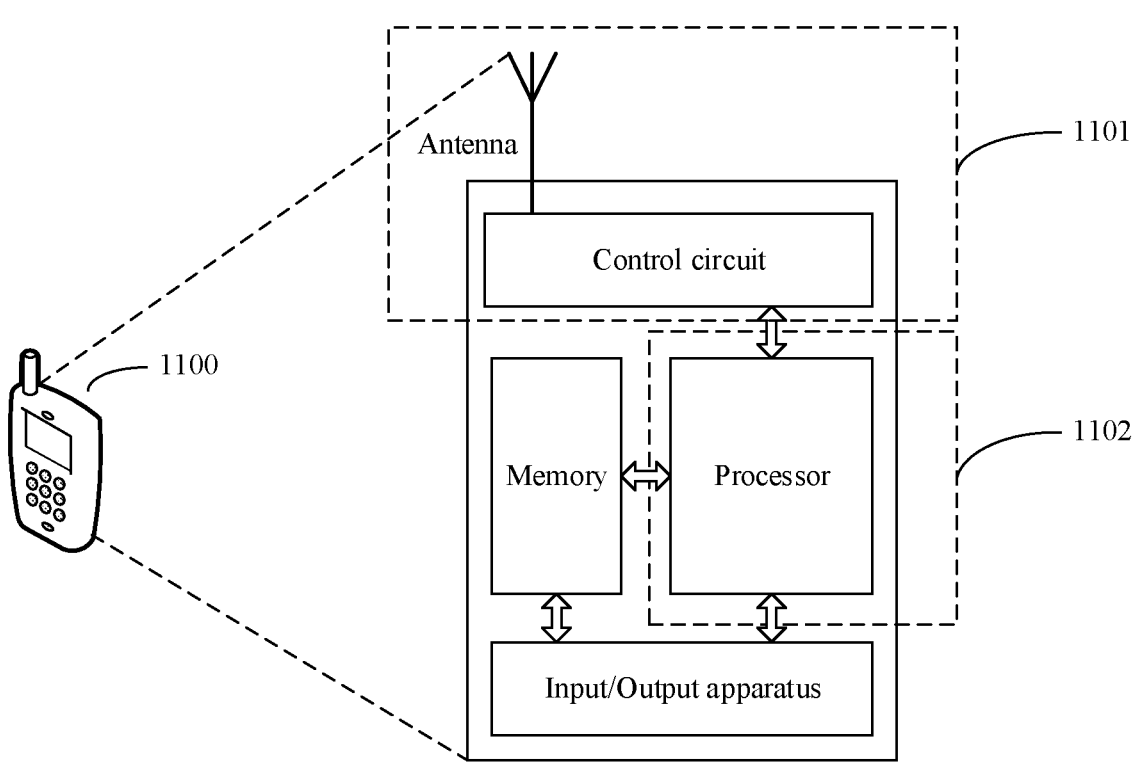
FIG. 11 is a schematic diagram of a structure of a terminal 1100 according to an embodiment of this application.

When the communication apparatus 800 is a terminal, FIG. 11 is a schematic diagram of a structure of a terminal according to an embodiment of this application. The terminal 1100 may be used in the system shown in FIG. 2 and FIG. 3, to perform a function of the terminal in the foregoing method embodiments. For ease of description, FIG. 11 shows only main components of the terminal.

As shown in FIG. 11, the terminal 1100 includes a processor, a memory, a control circuit, an antenna, and an input/output apparatus.

In this application, the antenna that has receiving and sending functions and the control circuit may be considered as a transceiver unit 1101 of the terminal 1100, configured to support the terminal in implementing the receiving function in the method embodiments, or configured to support the terminal in implementing the sending function in the method embodiments. The processor having a processing function is considered as a processing unit 1102 of the terminal 1100. As shown in FIG. 11, the terminal 1100 includes the transceiver unit 1101 and the processing unit 1102. The transceiver unit may also be referred to as a transceiver, a transceiver machine, a transceiver apparatus, or the like. Optionally, a device configured to implement the receiving function in the transceiver unit 1101 may be considered as a receiving unit. A device configured to implement the sending function in the transceiver unit 1101 may be considered as a sending unit. That is, the transceiver unit 1101 includes the receiving unit and the sending unit. The receiving unit may also be referred to as a receiver, an input port, a receiving circuit, or the like. The sending unit may be referred to as a transmitter, a transmitter machine, a transmitting circuit, or the like.

The processing unit 1102 may be configured to execute a program stored in the memory, to control the transceiver unit 1101 to receive a signal and/or send a signal, to implement functions of the terminal in the foregoing method embodiments. In an implementation, a function of the transceiver unit 1101 may be implemented via a transceiver circuit or a transceiver-dedicated chip.

This application further provides a communication system, including an access network device and a core network device. The access network device may be configured to perform the operations performed by the access network device in embodiments shown in FIG. 4 to FIG. 6, and the core network device may be configured to perform the operations performed by the core network node in embodiments shown in FIG. 4 to FIG. 6. The communication system may further include a TSN master and a TSN slave.

A person skilled in the art may be clearly aware that, the descriptions of embodiments provided in this application may be referenced to each other. For convenience and conciseness of description, for example, for functions of the apparatuses and devices provided in embodiments of this application and the performed steps, refer to related descriptions of the method embodiments of this application. The method embodiments and the apparatus embodiments may also be referenced, combined, or cited to each other.

In the several embodiments provided in this application, the disclosed systems, apparatuses and methods may be implemented in other manners. For example, some features of the method embodiments described above may be ignored or not performed. The described apparatus embodiments are merely examples. Division into the units is merely logical function division and may be other division in actual implementation. A plurality of units or components may be combined or integrated into another system. In addition, coupling between the units or coupling between the components may be direct coupling or indirect coupling, and the coupling may include an electrical connection, a mechanical connection, or another form of connection.

It needs to be understood that sequence numbers of the foregoing processes do not mean execution sequences in embodiments of this application. The execution sequences of the processes need to be determined based on functions and internal logic of the processes, and do not need to be construed as any limitation on the implementation processes of embodiments of this application. In addition, in embodiments of this application, the terminal and/or the network device (the access network device or the core network device) may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

What is claimed is:

1. A time synchronization method, comprising:
determining, by an access network device, a parameter for time synchronization between a terminal and a wireless network, wherein the parameter comprises an adjustment step of a timing advance (TA);
notifying, by the access network device, the terminal of the parameter; and
sending, by the access network device to the terminal, a physical downlink control channel (PDCCH) order with first indication information indicating a manner in which the terminal determines a value of the TA, wherein different manners for determining the value of the TA are indicable by PDCCH orders including the PDCCH order;
wherein the PDCCH order comprises a field indicating the manner, the field is a 1-bit field configurable with a first value indicating a common manner and a second value indicating a second manner, the common manner is a manner in which the terminal determines the value of TA using at least one of a first length of a timing advance command (TAC) field or a first adjustment step of the TA corresponding to the first length of the TAC field, and the second manner is a manner in which the terminal determines the value of TA using at least one of a second length of the TAC field or a second adjustment step corresponding to the second length of the TAC field.

2. The method of claim 1, the method further comprising:
receiving, by the access network device from a core network node, second indication information indicating the access network device to determine the parameter for time synchronization between the terminal and the wireless network.

3. The method of claim 2, wherein the access network device comprises a centralized unit (CU) and a distributed unit (DU), and the receiving the first indication information comprises:
receiving, by the CU, the first indication information from the core network node, the second access network device, or the first terminal; and
indicating, by the CU, the first indication information to the DU.

4. An apparatus for communication, comprising:
a memory storing instructions; and
at least one processor in communication with the memory, wherein the at least one processor executes the instructions to:
determine a parameter for time synchronization between a terminal and a wireless network, wherein the parameter comprises an adjustment step of a timing advance (TA);
notify the terminal of the parameter; and
send a physical downlink control channel (PDCCH) order with first indication information to the terminal, wherein indication information indicates a manner in which the terminal determines a value of the TA, different manners for determining the value of the TA are indicable by PDCCH orders including the PDCCH order;
wherein the PDCCH order comprises a field indicating the manner, the field is configurable with multiple values including a first value and a one or more second values, the first value indicates a common manner, the one or more second values each indicate a scale factor applied in a second manner, the common manner is a manner in which the terminal determines the value of the TA using at least one of a first length of a timing advance command (TAC) field or a first adjustment step of the TA corresponding to the first length of the TAC field, and the second manner is a manner in which the terminal determines an actual adjustment step of the TA using the scale factor indicated by the field and a second adjustment step of the TA, and then determines the value of the TA using the actual adjustment step.

5. The apparatus of claim 4, wherein the at least one processor executes the instructions to:
receive, from a core network node, second indication information indicating the first access network device to determine the parameter for time synchronization between the terminal and the wireless network.

6. A terminal, comprising
a memory storing instructions; and
at least one processor in communication with the memory, wherein the at least one processor executes the instructions to:
obtain, from an access network device, a parameter for time synchronization between the terminal and a wireless network, wherein the parameter comprises an adjustment step of a timing advance (TA);
receive a physical downlink control channel (PDCCH) order with first indication information from the access network device, wherein the first indication information indicates a manner in which the terminal determines a value of the TA, wherein different manners for determining the value of the TA are indicable by PDCCH orders including the PDCCH order;

obtain a scale factor from the PDCCH order, wherein the scale factor is used for determining an actual adjustment step of the TA;

determine the actual adjustment step of the TA using the scale factor; and determine the value of the TA using the actual adjustment step of the TA.

7. The terminal of claim 6, wherein the PDCCH order comprises a field indicating the manner, the field is configurable with multiple values including a first value and a one or more second values, the first value indicates a common manner, the one or more second values each indicate a scale factor applied in a second manner, the common manner is a manner in which the terminal determines the value of the TA using at least one of a first length of a timing advance command (TAC) field or a first adjustment step of the TA corresponding to the first length of the TAC field, and the second manner is a manner in which the terminal determines the actual adjustment step of the TA using the scale factor indicated by the field and a second adjustment step of the TA, and then determines the value of the TA using the actual adjustment step.

8. An apparatus for communication, comprising:
a memory storing instructions; and at least one processor in communication with the memory, wherein the at least one processor executes the instructions to:

determine a parameter for time synchronization between a terminal and a wireless network, wherein the parameter comprises an adjustment step of a timing advance (TA);

notify the terminal of the parameter; and send a physical downlink control channel (PDCCH) order with first indication information to the terminal, wherein indication information indicates a manner in which the terminal determines a value of the TA, different manners for determining the value of the TA are indicable by PDCCH orders including the PDCCH order;

wherein the PDCCH order comprises a field indicating the manner, wherein the field is a 1-bit field configurable with a first value indicating a common manner and a second value indicating a second manner, the common manner is a manner in which the terminal determines the value of TA using at least one of a first length of a timing advance command (TAC) field or a first adjustment step of the TA corresponding to the first length of the TAC field, and the second manner is a manner in which the terminal determines the value of TA using at least one of a second length of the TAC field or a second adjustment step corresponding to the second length of the TAC field.

* * * * *